(12) United States Patent
Tomioka

(10) Patent No.: US 9,500,981 B2
(45) Date of Patent: Nov. 22, 2016

(54) OPTICAL SCANNING APPARATUS AND IMAGE FORMING APPARATUS INCLUDING THE SAME

(71) Applicant: CANON KABUSHIKI KAISHA, Tokyo (JP)

(72) Inventor: Yuichi Tomioka, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/818,189

(22) Filed: Aug. 4, 2015

(65) Prior Publication Data

US 2016/0041492 A1    Feb. 11, 2016

(30) Foreign Application Priority Data

Aug. 8, 2014 (JP) ................. 2014-163209
Aug. 8, 2014 (JP) ................. 2014-163210

(51) Int. Cl.
| | |
|---|---|
| G03G 15/04 | (2006.01) |
| G03G 15/043 | (2006.01) |
| G02B 26/10 | (2006.01) |
| G02B 26/08 | (2006.01) |
| B41J 2/44 | (2006.01) |

(52) U.S. Cl.
CPC ......... *G03G 15/043* (2013.01); *G02B 26/0816* (2013.01); *G02B 26/10* (2013.01); *B41J 2/442* (2013.01)

(58) Field of Classification Search
CPC ............ G03G 15/0178; G03G 15/04036; G03G 15/043; G03G 15/0435; B41J 2/435

USPC ................................. 399/178, 205
See application file for complete search history.

(56) References Cited

U.S. PATENT DOCUMENTS

| | | | |
|---|---|---|---|
| 5,812,181 A * | 9/1998 | Ishibe | 347/258 |
| 6,734,890 B2 * | 5/2004 | Takeuchi | G02B 26/123 347/244 |
| 7,161,724 B1 * | 1/2007 | Miyatake | 359/204.1 |
| 2003/0231407 A1 * | 12/2003 | Koreeda et al. | 359/719 |
| 2005/0057636 A1 * | 3/2005 | Mori | 347/140 |
| 2007/0119935 A1 | 5/2007 | Shimomura | |

(Continued)

FOREIGN PATENT DOCUMENTS

| | | |
|---|---|---|
| JP | 2003-270565 A | 9/2003 |
| JP | 2006-259538 A | 9/2006 |

(Continued)

*Primary Examiner* — Benjamin Schmitt
(74) *Attorney, Agent, or Firm* — Canon USA, Inc. IP Division

(57) ABSTRACT

An optical scanning apparatus includes a deflector configured to respectively deflect first and second light beams by a first deflection surface and scan first and second scanned surfaces in a main scanning direction, and first and second imaging optical systems configured to respectively collect the first and second light beams deflected by the deflector to the first and second scanned surfaces. The first and second imaging optical systems include a shared multistage lens including first and second optical surfaces arranged in a sub-scanning direction to which each of the first and second light beams enters, the second scanned surface is disposed on a position closer to the deflector than the first scanned surface, and a second optical path length from the first deflection surface to the second scanned surface is longer than a first optical path length from the first deflection surface to the first scanned surface.

19 Claims, 21 Drawing Sheets

(56) References Cited

U.S. PATENT DOCUMENTS

| | | | |
|---|---|---|---|
| 2009/0022518 A1* | 1/2009 | Tomioka | G02B 26/125 399/151 |
| 2009/0092417 A1* | 4/2009 | Shimomura | 399/223 |
| 2011/0316960 A1* | 12/2011 | Igarashi et al. | 347/224 |

FOREIGN PATENT DOCUMENTS

| | | |
|---|---|---|
| JP | 2007-155838 A | 6/2007 |
| JP | 2013-064857 A | 4/2013 |
| JP | 2014-048563 A | 3/2014 |

* cited by examiner

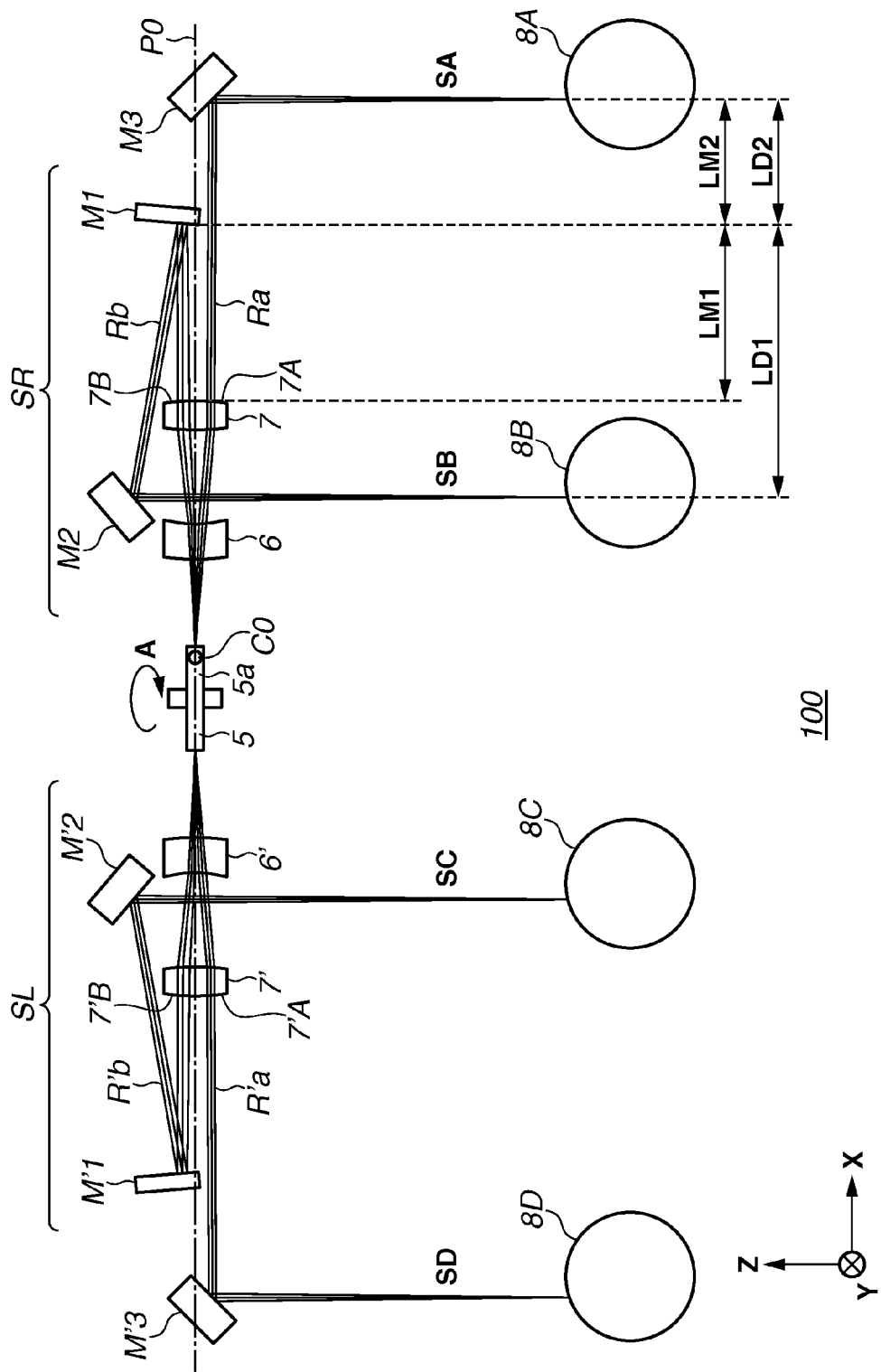

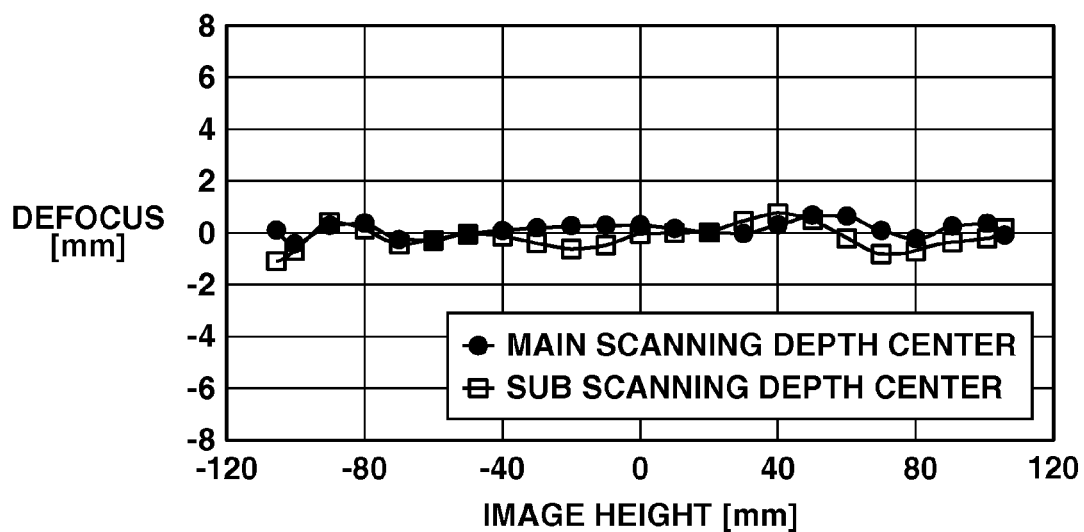
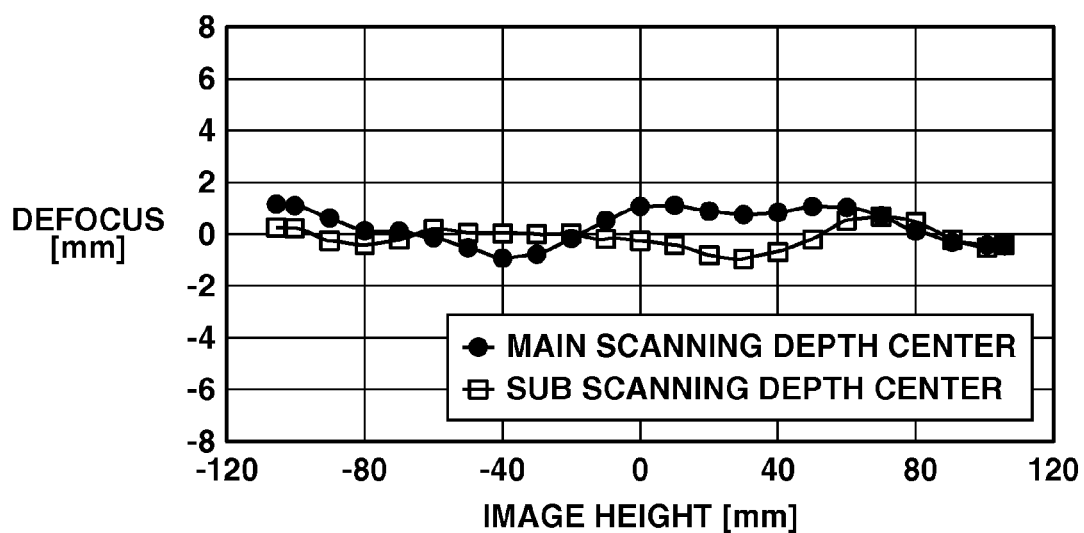

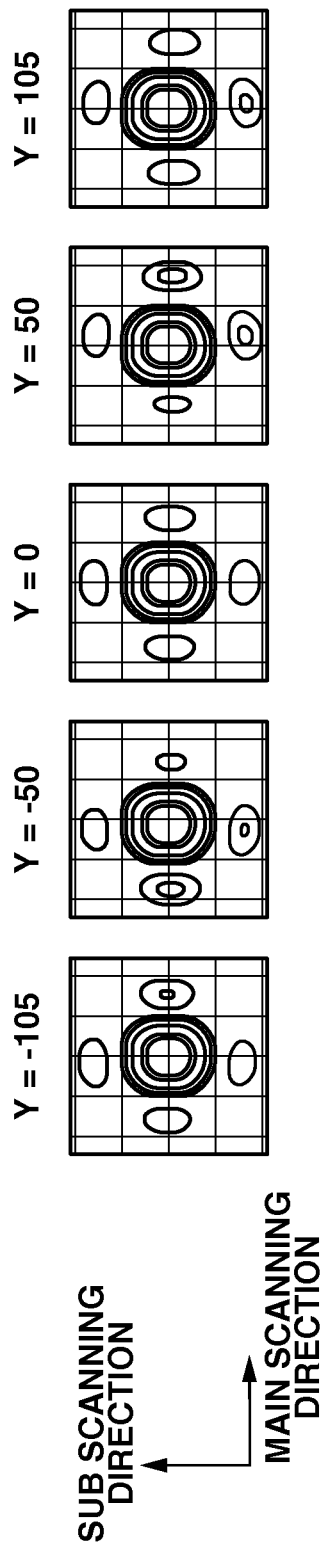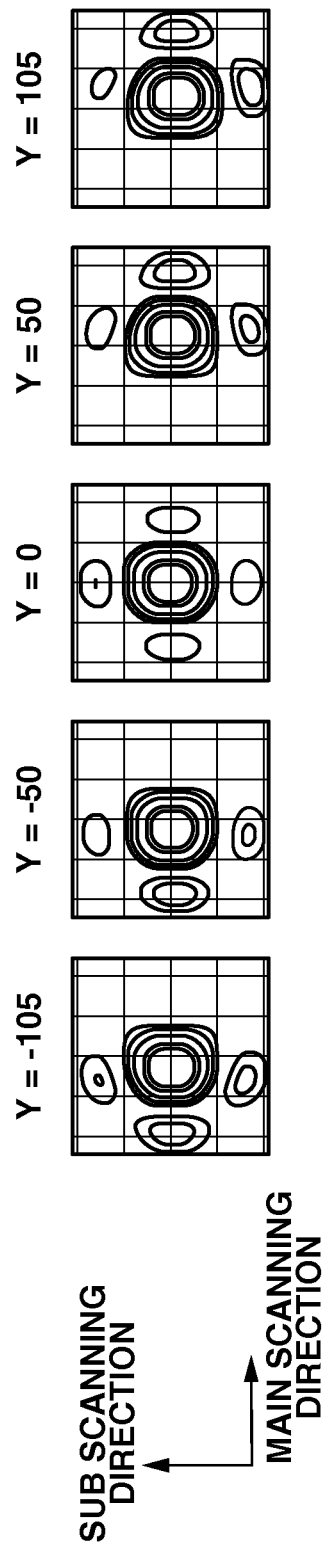

GENERATRIX SHAPE DIFFERENCE

THICKNESS DIFFERENCE

LEVEL DIFFERENCE AT BOUNDARY

SCANNING LINE BENDING

SCANNING LINE BENDING

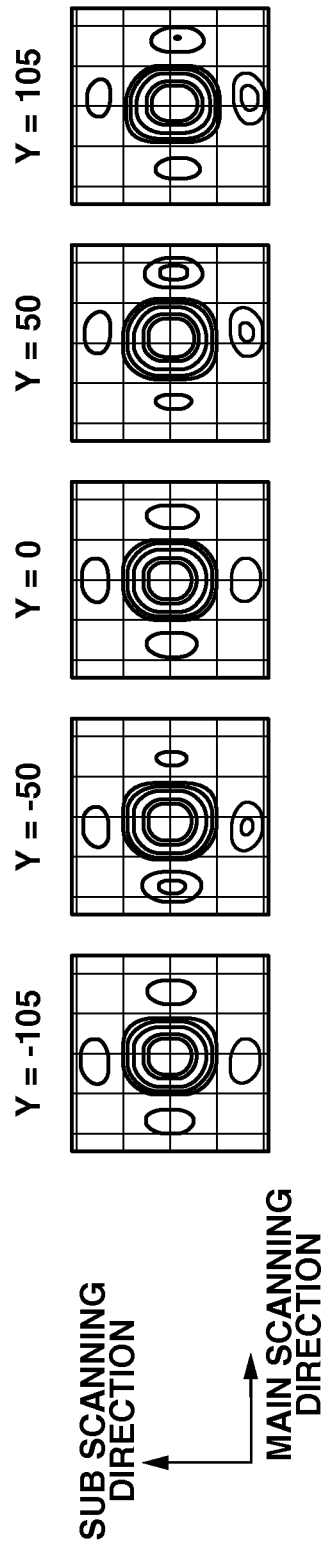
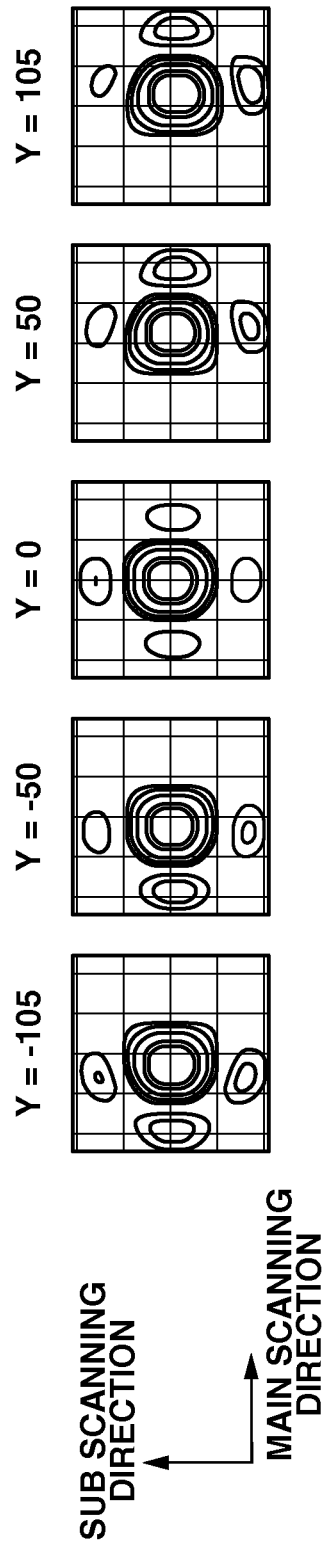

GENERATRIX SHAPE DIFFERENCE

THICKNESS DIFFERENCE

LEVEL DIFFERENCE AT BOUNDARY

OPTICAL SCANNING APPARATUS AND IMAGE FORMING APPARATUS INCLUDING THE SAME

BACKGROUND OF THE INVENTION

Field of the Invention

The present invention relates to an optical scanning apparatus included in an image forming apparatus, such as a laser beam printer (LBP), a digital copying machine, and a multifunction printer (MFP).

Description of the Related Art

As an optical scanning apparatus included in an image forming apparatus, an optical scanning apparatus is known which can optically scan photosensitive surfaces (scanned surfaces) of a plurality of photosensitive members at the same time by a single deflector. A patent literature (Japanese Patent Application Laid-Open No. 2013-64857) describes an optical scanning apparatus which is downsized by disposing a mirror on each optical path from a deflector to each scanned surface to bend each optical path. A patent literature 2 (Japanese Patent Application Laid-Open No. 2014-48563) describes an optical scanning apparatus which adopts a multistage lens in which a plurality of lens surfaces is combined by overlapping with each other in a sub-scanning direction to reduce the number of lenses. A patent literature 3 (Japanese Patent Application Laid-Open No. 2007-155838) describes an optical scanning apparatus which devises arrangement of mirrors for reflecting a light beam passed through a multistage lens to reduce the number of mirrors.

However, in the optical scanning apparatuses described in the patent literatures 1 to 3, optical path lengths with respect to each scanned surface are the same with each other, so that a degree of freedom in arrangement of each optical component is low, and it is difficult to avoid interference of a light beam with an imaging lens while downsizing the entire apparatus.

According to the optical scanning apparatus described in the patent literature 1, the imaging lens is arranged between two mirrors on an optical path corresponding to a photosensitive member closer to the deflector, and if each component is arranged so as not to interfere the light beam, it is difficult to further thin the entire apparatus. According to the optical scanning apparatus described in the patent literature 2, three mirrors are arranged on an optical path corresponding to the photosensitive member closer to the deflector to avoid interference of the multistage lens with the light beam, and it is difficult to reduce the number of components in the entire apparatus. According to the optical scanning apparatus described in the patent literature 3, a large reflection angle of a mirror is set on an optical path corresponding to the photosensitive member closer to the deflector to avoid interference of the multistage lens with the light beam, so that a distance between two mirrors is long, and the apparatus becomes large.

SUMMARY OF THE INVENTION

The present invention is directed to the provision of an optical scanning apparatus in which the number of components are reduced and a height of a sub-scanning direction is sufficiently reduced and an image forming apparatus including the optical scanning apparatus.

According to an aspect of the present invention, An optical scanning apparatus include first and second light sources, a deflector configured to respectively deflect first and second light beams emitted from the first and second light sources by a first deflection surface and scan first and second scanned surfaces in a main scanning direction, and first and second imaging optical systems configured to respectively collect the first and second light beams deflected by the deflector to the first and second scanned surfaces, wherein the first and second imaging optical systems include a shared multistage lens including first and second optical surfaces arranged in a sub-scanning direction to which each of the first and second light beams enters, wherein the second scanned surface is disposed on a position closer to the deflector than the first scanned surface, and wherein a second optical path length from the first deflection surface to the second scanned surface is longer than a first optical path length from the first deflection surface to the first scanned surface.

Further features of the present invention will become apparent from the following description of exemplary embodiments with reference to the attached drawings.

BRIEF DESCRIPTION OF THE DRAWINGS

FIG. 1 is a diagrammatic illustration (a sub-scanning cross section drawing) of main parts of an optical scanning apparatus according to a first exemplary embodiment of the present invention.

FIGS. 4A and 4B illustrate field curvature in a main scanning direction and a sub-scanning direction according to the first exemplary embodiment of the present invention.

FIGS. 7A and 7B illustrate a spot shape on each image height according to the first exemplary embodiment of the present invention.

FIGS. 17A and 17B illustrate a spot shape on each image height according to the second exemplary embodiment of the present invention.

DESCRIPTION OF THE EMBODIMENTS

Figure 2A:
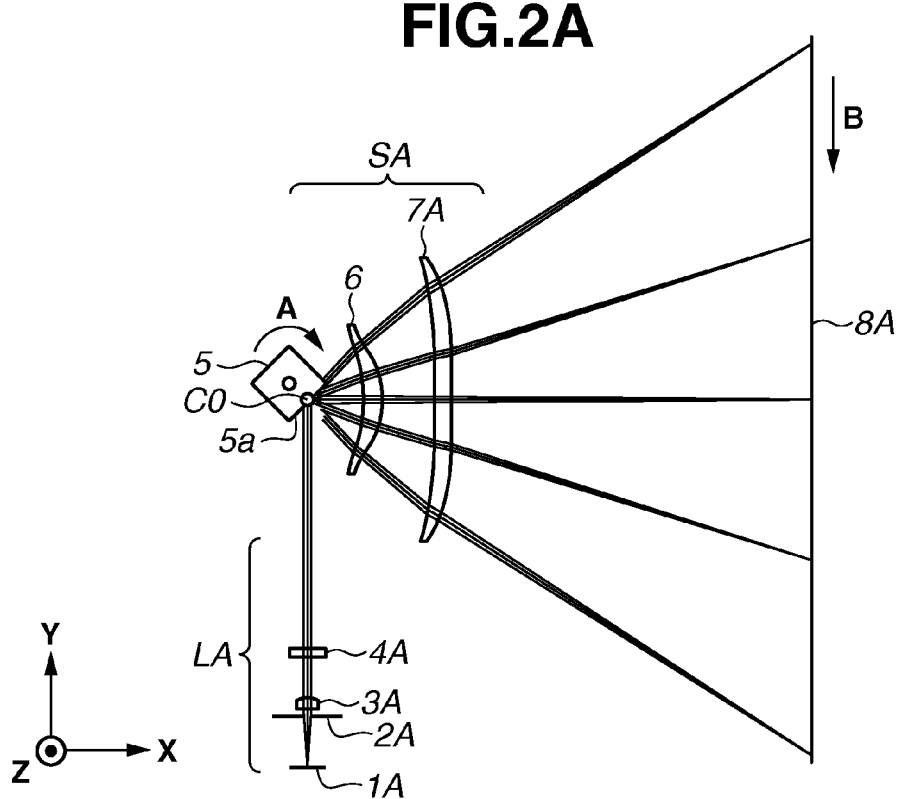
FIGS. 2A and 2B are diagrammatic illustrations (a main scanning cross section drawing) of main parts of the optical scanning apparatus according to the first exemplary embodiment of the present invention.

Various exemplary embodiments, features, and aspects of the invention will be described in detail below with reference to the drawings. A scale of each drawing may be different from an actual scale for the sake of convenience. The same reference numerals are used for the same members throughout the drawings to avoid repetition in descriptions. In the following descriptions, a main scanning direction (a Y direction) is a direction perpendicular to a rotation axis (or a swing axis) of a deflector and an optical axis direction (an X direction) (i.e., a direction that the deflector scans the scanned surface), and a sub-scanning direction (a Z direction) is a direction parallel to the rotation axis (or the swing axis) of the deflector. Further, a main scanning cross section (an XY cross section) is a cross section perpendicular to the sub-scanning direction (i.e., a cross section including the main scanning direction and the optical axis), and a sub-scanning cross section (a ZX cross section) is a cross section perpendicular to the main scanning direction (i.e., a cross section including the sub-scanning direction and the optical axis).

Figure 2B:
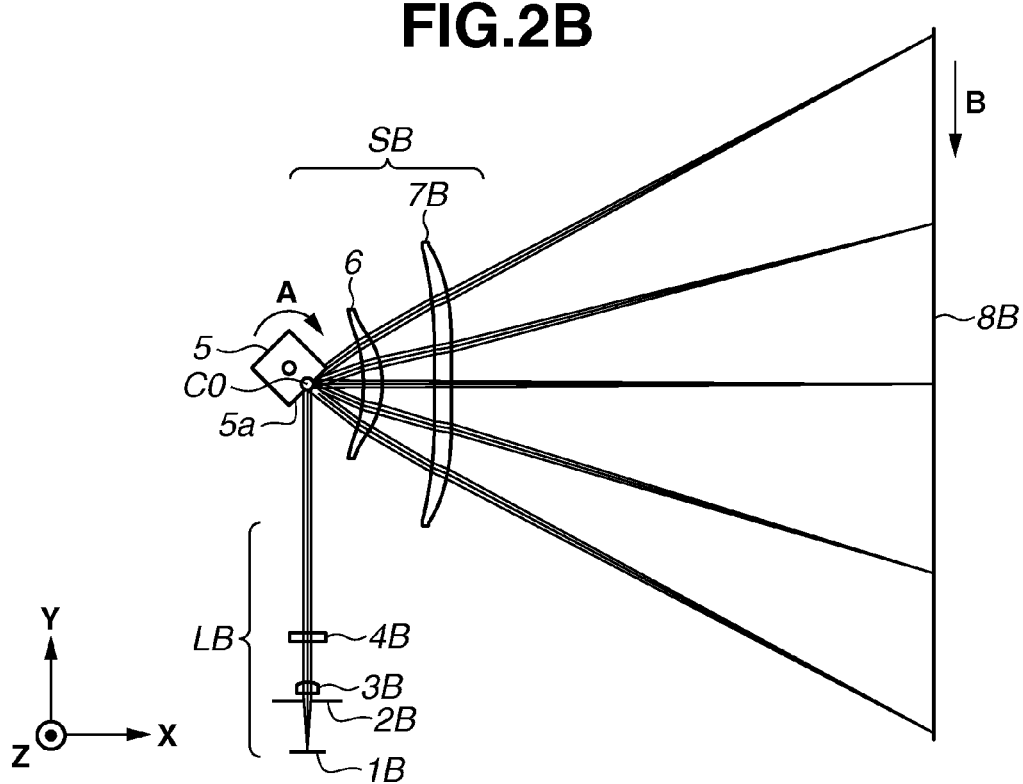
Figure 3:
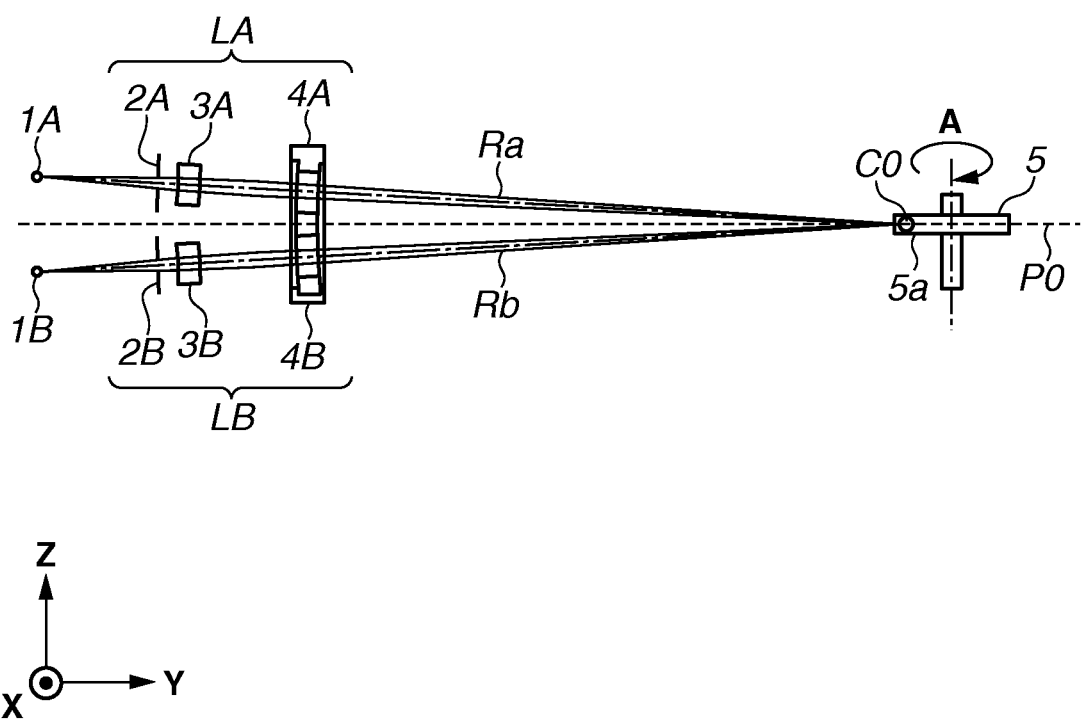
FIG. 3 is a diagrammatic illustration (a sub-scanning cross section drawing) of main parts of an incident optical system according to the first exemplary embodiment of the present invention.

FIGS. 1 to 3 are diagrammatic illustrations of main parts of an optical scanning apparatus 100 according to a first exemplary embodiment of the present invention. FIG. 1 is a ZX cross section drawing (a sub-scanning cross section drawing), FIGS. 2A and 2B are XY cross section drawings (a main scanning cross section drawings), and FIG. 3 is a YZ cross section drawing. In FIGS. 2A and 2B, an optical path reflected by a mirror is developed and the mirror is omitted. In each drawing, main parts of the optical scanning apparatus 100 is magnified, and other members are omitted.

The optical scanning apparatus 100 according to the present exemplary embodiment is a tandem type optical scanning apparatus which respectively records image information pieces corresponding to four different hues (K, C, M, and Y) on four different scanned surfaces (photosensitive surfaces) 8A to 8D at the same time. The optical scanning apparatus 100 includes light sources 1A to 1D, incident optical systems LA to LD, a deflector 5, imaging optical systems SR and SL, and mirrors M1 to M'3. According to the present exemplary embodiment, components included in the optical scanning apparatus 100 are each arranged symmetrically on both right and left sides across the deflector 5. The configuration and its optical action are the same on the right side and the left side, so that the configuration (a scanning unit) on the right side (+X side) of the deflector is mainly described below.

As illustrated in FIG. 3, a first light beam Ra emitted from a first light source 1A and a second light beam Rb emitted from a second light source 1B are guided to the deflector 5 by the incident optical systems LA and LB. At that time, the light beams Ra and Rb are deflected by a deflection surface (a first deflection surface) 5a among a plurality of deflection surfaces of the deflector 5. A point C0 in the drawing is a deflection point (a reference point) when a principal ray of the light beam on the axis is deflected, and a plane P0 is a plane (a reference plane) passing through the deflection point C0 and perpendicular to the rotation axis of the deflector 5. The light beams Ra and Rb entered into the deflection surface 5a are crossed and deflected at the deflection point C0 in the sub-scanning cross section. In the following descriptions, a length of an optical path from the deflection point C0 to each scanned surface is regarded as an optical path length from the deflection surface 5a to each scanned surface.

As illustrated in FIG. 1, the imaging optical system SR includes imaging lenses 6 and 7, and both lenses are shared by the light beams Ra and Rb. According to the present exemplary embodiment, the imaging lens 6 which is the closest to the deflector 5 in the optical path has a symmetrical shape in the sub-scanning direction with respect to a reference plane P0 (the same shape with respect to the light beams Ra and Rb). On the other hand, the imaging lens 7 which is the closest to the scanned surface in the optical path has an asymmetrical shape in the sub-scanning direction with respect to the reference plane P0, namely a shape on an upper side and a shape on a lower side with respect to the reference plane P0 are different in both of the main scanning cross section and the sub-scanning cross section.

More specifically, the imaging lens 7 is a multistage lens in which a first imaging portion 7A including a first optical surface and a second imaging portion 7B including a second optical surface are arranged in the sub-scanning direction. Adoption of the multistage lens with this configuration realizes reduction of the number of the imaging lenses constituting the imaging optical system SR and also reduction of size and cost of the optical scanning apparatus 100. In the following descriptions, a portion corresponding to the light beam Ra is referred to as a first imaging optical system SA, and a portion corresponding to the light beam Rb is referred to as a second imaging optical system SB in the imaging optical system SR.

The light beam Ra deflected by the deflector 5 is collected by the imaging lens 6 and the first imaging portion 7A, reflected by the mirrors M3, and guided to a first scanned surface 8A (K). The light beam Rb deflected by the deflector 5 is collected by the imaging lens 6 and the second imaging portion 7B, reflected by the mirror M1 (a first mirror) and the mirror M2 (a second mirror), and guided to a second scanned surface 8B (C). According to the present exemplary embodiment, a mirror other than the first and the second mirrors (a mirror other than the mirror M1 and the mirror M2) is not disposed on an optical path from the deflection surface 5a to the scanned surface 8B.

According to the present exemplary embodiment, the imaging lens 7 closest to the scanned surface is disposed on the deflector 5 side closer than all mirrors on the optical path of the imaging optical system SR. In other words, no other imaging lens is disposed on the optical path on the scanned surface side from the imaging lens 7, and no imaging lens is disposed on the optical path on the scanned surface side from the mirror M1 closest to the deflector 5. Accordingly, a length of the imaging lens 7 in the main scanning direction can be shortened, and the optical scanning apparatus 100 can be downsized.

When the configuration in which all mirrors are disposed behind all of the imaging lenses and the light beams are reflected after passing through all of the imaging lenses is adopted as in the case of the present exemplary embodiment, it is necessary to avoid interference of each reflected light beam with each imaging lens. However, the above-described related art documents include configurations in which an optical path length with respect to each scanned surface is equal to each other and thus have an issue of increase of a size of an entire apparatus and the number of mirrors.

According to the present exemplary embodiment, the optical scanning apparatus 100 is constituted in such a manner that a second optical path length from the deflector 5 to the scanned surface 8B which is spatially closest from the deflector 5 is longer than a first optical path length from the deflector 5 to the scanned surface 8A which is spatially farthest from the deflector 5. Accordingly, compared with the case that each optical path has the same length, the present exemplary embodiment can lessen a reflection angle of the mirror M1 (an angle between the light beam Rb reflected by the mirror M1 and the reference plane P0) which is necessary to avoid interference of each imaging lens with each light beam. Thus, according to the present exemplary embodiment, the light beam Rb from the imaging lens 7 can be guided to the scanned surface 8B only by the mirror M1 and the mirror M2 while avoiding the interference with each imaging lens, and the number of components constituting the optical scanning apparatus 10 can be reduced.

In addition, as illustrated in FIG. 1, the mirror M1 according to the present exemplary embodiment is disposed on an upper side with respect to a center position of an outer shape of the imaging lens 7 in the sub-scanning direction and reflects the light beam Rb from the imaging lens 7 upward to the imaging lens 7. Further, the mirror M2 according to the present exemplary embodiment is disposed on an upper side with respect to the center position of the outer shape of the imaging lens 7 in the sub-scanning direction and reflects the light beam Rb from the mirror M1 so as to pass through between the imaging lens 6 and the imaging lens 7 to guide it to the scanned surface 8B. The second optical path length is thus set longer than the first optical path length, so that a first reflection point on the mirror M1 and a second reflection point on the mirror M2 of the light beam Rb can be positioned on the same side with respect to the center position of the outer shape of the imaging lens 7 in the sub-scanning direction. Accordingly, the mirror M2 can be disposed to a position closer to the reference plane P0, and a height of the optical scanning apparatus 100 in the sub-scanning direction can be sufficiently reduced.

According to the present exemplary embodiment, it is configured that the light beam Rb reflected by the mirror M2 passes through between the imaging lens 6 and the imaging lens 7, however, the configuration is not limited to the above-described one. In other words, the optical path from the deflector 5 to the imaging lens 7 and the optical path from the mirror M2 to the scanned surface 8B are only necessary to be configured to cross each other in the sub-scanning cross section. According to the above-described configuration, there is no light beam passing below each imaging lens, and thus a configuration of an optical box storing each optical component can be simplified.

FIG. 2A is a main scanning cross section drawing in which an optical path from the light source 1A to the scanned surface 8A is developed. FIG. 2B is a main scanning cross section drawing in which an optical path from the light source 1B to the scanned surface 8B is developed. As illustrated in these drawings, according to the present exemplary embodiment, the optical path lengths of the respective imaging optical systems SA and SB are differentiated from each other, so that a degree of freedom in arrangement of each optical component is improved. When the shorter optical path length is defined as T1, and the longer optical path length is defined as T2, it is desirable that T1 and T2 satisfy a following conditional equation (1).

$$25 \leq T2-T1 \leq 65 \tag{1}$$

When a value is less than a minimum value of the conditional equation (1), it is difficult to restrict a height of the optical scanning apparatus 100 while avoiding interference of the light beam Rb with the imaging lens 7. Further, when a value is greater than a maximum value of the conditional equation (1), it is necessary to enlarge a shape difference between the first imaging portion 7A and the second imaging portion 7B in the imaging lens 7, and it is difficult to integrally mold the respective portions. In addition, it is further desirable to satisfy a following conditional equation (1a) to restrict the height of the optical scanning apparatus 100 while reducing the number of components.

$$30 < T2-T1 < 50 \tag{1a}$$

According to the present exemplary embodiment, the optical path length corresponding to the imaging optical system SA is given as Ta=T1=155.733 mm, the optical path length corresponding to the imaging optical system SB is given as Tb=T2=197.000 mm, and T2−T1=41.267 mm is obtained, so that the conditional equations (1) and (1a) are satisfied.

As described above, in order to differentiate optical path lengths from each other and reduce the shape difference between the first imaging portion 7A and the second imaging portion 7B in the imaging lens 7, it is desirable to appropriately set convergence of each light beam entering into the deflection surface 5a in the main scanning cross section (convergence of the imaging optical system). In the main scanning cross section, when an optical distance (the optical path length) from a rear principal plane of the imaging optical system to the scanned surface is defined as Sk (mm), and a focal length of the imaging optical system is defined as f (mm), the convergence of the imaging optical system is expressed as m=1−Sk/f. A state of the light beam entering into the deflection surface 5a in the main scanning cross section is different according to the convergence. When the convergence is given as m=0, the light beam is a parallel light beam, when the convergence is given as m<0, the light beam is a divergent light beam, and when the convergence is given as m>0, the light beam is a convergent light beam.

When the convergence of the imaging optical system corresponding to the shorter optical path is defined as m1, and the convergence of the imaging optical system corresponding to the longer optical path is defined as m2, it is desirable that m1 and m2 satisfy a following conditional equation (2).

$$0.15 < m1-m2 < 0.50 \tag{2}$$

When a value is less than a minimum value of the conditional equation (2), it is necessary to enlarge the shape difference between the first imaging portion 7A and the second imaging portion 7B to produce a difference in the optical path lengths, and it is difficult to integrally mold the respective portions. Further, when a value is greater than a maximum value of the conditional equation (2), an absolute value of either one of the convergence m1 and m2 becomes large, and jitter of the main scanning direction (main scanning jitter) is largely generated which is caused by surface eccentricity (a shift eccentricity error) of each deflection surface included in the deflector 5. In addition, it is further desirable to satisfy a following conditional equation (2a) to restrict the height of the optical scanning apparatus 100 while reducing the number of components.

$$0.20<m1-m2<0.40 \tag{2a}$$

In the main scanning cross section, an optical path length from a rear principal plane of the imaging optical system SA to the scanned surface 8A is defined as Sk1 (mm), and a focal length of the imaging optical system SA is defined as f1 (mm). Further, in the main scanning cross section, an optical path length from a rear principal plane of the imaging optical system SB to the scanned surface 8B is defined as Sk2 (mm), and a focal length of the imaging optical system SB is defined as f2 (mm). Furthermore, first convergence of the imaging optical system SA and second convergence of the imaging optical system SB are respectively defined as $m1=1-Sk1/f1$ and $m2=1-Sk2/f2$. In this regard, according to the present exemplary embodiment, the convergence of the imaging optical system SA is given as $ma=m1=0.047$, the convergence of the imaging optical system SB is given as $mb=m2=-0.254$, and $m1-m2=0.30$ is obtained, so that the conditional equations (2) and (2a) are satisfied. In addition, when a greater one of $|m1|$ and $|m2|$ is defined as m, it is desirable that m satisfies a following conditional equation (3).

$$0.2<m<0.5 \tag{3}$$

When a value is less than a minimum value of the conditional equation (3), it is necessary to enlarge the shape difference between the first imaging portion 7A and the second imaging portion 7B to produce a difference in the optical path lengths, and it is difficult to integrally mold the respective portions. Further, when a value is greater than a maximum value of the conditional equation (3), the main scanning jitter is largely generated which is caused by the shift eccentricity error of each deflection surface included in the deflector 5. In addition, it is further desirable to satisfy a following conditional equation (3a).

$$0.22<m<0.4 \tag{3a}$$

According to the present exemplary embodiment, since $m=|m2|=0.254$ is given, the conditional equations (3) and (3a) are satisfied.

When a scanning image height is defined as Y (mm), and a scanning field angle corresponding to the scanning image height Y is defined as θ(rad), a scanning characteristic (Kθ characteristic) of the imaging optical system SR is expressed by an expression $Y=K\theta$. Here, a coefficient K which is a ratio of the scanning field angle θ to the scanning image height Y is defined as the Kθ coefficient. When, the Kθ coefficient of the imaging optical system corresponding to the shorter optical path is defined as K1, and the Kθ coefficient of the imaging optical system corresponding to the longer optical path is defined as K2, it is desirable that K1 and K2 satisfy a following conditional equation (4).

$$0.65<K1/K2<0.85 \tag{4}$$

When a value is less than a minimum value of the conditional equation (4), it is difficult to realize both of the Kθ characteristic and correction of a field curvature in the main scanning direction. Further, when a value is greater than a maximum value of the conditional equation (4), it is necessary to enlarge the shape difference between the first imaging portion 7A and the second imaging portion 7B to produce a difference in the optical path lengths, and it is difficult to integrally mold the respective portions. In order to reduce the shape difference between the first imaging portion 7A and the second imaging portion 7B and to obtain an excellent image forming performance, it is further desirable to satisfy a following conditional equation (4a).

$$0.70<K1/K2<0.83 \tag{4a}$$

According to the present exemplary embodiment, the Kθ coefficient of the imaging optical system SA is given as $Ka=K1=132.0$ (mm/rad), the Kθ coefficient of the imaging optical system SB is given as $Kb=K2=167.0$ (mm/rad), and $K1/K2=0.79$ is obtained, so that the conditional equations (4) and (4a) are satisfied.

As illustrated in FIG. 3, the incident optical systems LA and LB according to the present exemplary embodiment respectively include aperture stops 2A and 2B, coupling lenses 3A and 3B, and cylindrical lenses (cylinder lenses) 4A and 4B. The incident optical systems LA and LB are a sub-scanning oblique incidence optical system in which the light beams Ra and Rb are entered obliquely to the deflection surface 5a in the sub-scanning cross section. When such a sub-scanning oblique incidence optical system is adopted, each light beam can be separately deflected while suppressing increase in the size of each deflection surface in the sub-scanning direction.

In this regard, if an oblique incidence angle to the reference plane P0 is too large, it is difficult to correct deformation of a spot due to a twist of wavefront aberration, whereas if the oblique incidence angle is too small, it is difficult to separate each optical path. Thus, according to the present exemplary embodiment, the oblique incidence angles of the incident optical systems LA and LB are respectively set to $\alpha sA=-3.0°$ and $\alpha sB=3.0°$, and absolute values of the both oblique incidence angles are set to be 3.0°, so that the correction of the spot deformation and separation of each optical path are facilitated.

According to the present exemplary embodiment, a semiconductor laser is adopted as a light source, the light beams Ra and Rb emitted from the light sources 1A and 1B are divergent light beams, and the incident optical systems LA and LB convert the light beams Ra and Rb into approximately parallel light beams in the sub-scanning cross section. In addition, in the main scanning cross section, the light beam Ra is converted into a weak convergent light beam (set to $m=0.047$) by the coupling lens 3A, and the light beam Rb is converted into a weak divergent light beam (set to $m=-0.254$) by the coupling lens 3B. In this regard, an anamorphic surface is adopted to a light emitting surface of each of the coupling lenses 3A and 3B, and a curvature radius of the main scanning cross section of each lens is differentiated, so that each convergence is set to a desired value.

The aperture stops 2A and 2B have an aperture diameter different from each other in the sub-scanning direction so that same spot diameters (a 1/e2 slice diameter of a peak light amount of the spot) are obtained on the respectively corresponding scanned surfaces 8A and 8B. The cylindrical lenses 4A and 4B respectively collect the light beams Ra and Rb which are formed (controlled their light amounts) by the aperture stops 2A and 2B and collected by the coupling lenses 3A and 3B to the deflection surface 5a only in the sub-scanning cross section to form a line image long in the main scanning direction. In this regard, in the main scanning cross section, respective angles α between optical axes (or principal rays of the light beams Ra and Rb entering into the deflection surface 5a) of the incident optical systems LA and LB and optical axes of the imaging optical systems SA and SB are given as α=90°.

The incident optical systems LA and LB according to the present exemplary embodiment both include the same configurations except for shapes of the apertures formed on the aperture stops 2A and 2B and shapes of the light emitting surfaces of the coupling lenses 3A and 3B, and the optical path lengths from the light sources 1A and 1B to the deflection surface 5a are also the same with each other. As described above, arrangement of optical components constituting the respective incident optical systems LA and LB are commonalized, so that types of holding portions for holding each component and types of assembly tools can be reduced, and the productivity can be improved.

The deflector 5 according to the present exemplary embodiment is a rotating polygon mirror (a polygon mirror) including four deflection surfaces of which diameter of a circumscribed circle is 20 mm and is rotated in a direction indicated by an arrow A at a constant speed by a driving force generated by a driving unit (a motor), not illustrated. As illustrated in FIG. 2, each of the scanned surfaces 8A and 8B can be optically scanned in a direction indicated by an arrow B by the rotation of the deflector 5. As illustrated in FIG. 1, when the light beams Ra and Rb are deflected by the deflection surface 5a of the deflector 5, light beams R'a and R'b emitted from light sources 1C and 1D of a scanning unit on a left side (−X side) with respect to the deflector 5 are deflected by a deflection surface different from the deflection surface 5a. Then, the light beams R'a and R'b are guided to scanned surfaces 8C(M) and 8D(Y) by the imaging optical system SL having the same optical action as that of the above-described imaging optical system SR. According to the above-described configuration, images in four colors, namely yellow (Y), magenta (M), cyan (C), and black (Bk), can be simultaneously formed.

Next, the configuration of the imaging optical system is described in detail below. The configuration of the imaging optical system SB is the same as that of the imaging optical system SA except for the imaging lens 7, so that the imaging optical system SA is mainly described below. The imaging optical system SA collects the light beam Ra deflected by the deflector 5 on the scanned surface 8A and form a spot image. The imaging optical system SA is configured so that the deflection surface 5a and the scanned surface 8A are optically conjugated in the sub-scanning cross section. In other words, the imaging optical system SA forms a surface tilt correction optical system which performs correction (surface tilt correction) on an influence due to a difference (a surface tilt) in an angle of tilt of each deflection surface in the sub-scanning cross section.

The following Tables 1 to 4 show specification values, optical arrangement, and a surface shape of each imaging lens of the optical scanning apparatus 100 according to the present exemplary embodiment. In Table 1, specification values and lens arrangement of the incident optical system LA and the imaging optical system SA are shown. In Table 2, lens shapes of the incident optical system LA and the imaging optical system SA are shown. In Table 3, specification values and lens arrangement of the incident optical system LB and the imaging optical system SB are shown. In Table 4, lens shapes of the incident optical system LB and the imaging optical system SB are shown. Columns of the optical arrangement in Tables 1 and 3 show coordinates of reflection points on the respective mirrors of the light beams Ra and Rb advancing toward a center of an image (an axial image height) in the main scanning direction on the scanned surface.

TABLE 1

| | Specification Value | |
|---|---|---|
| laser wavelength(nm) | λ | 790 |
| laser irradiation angle in main scanning cross section (deg) | αm | 90 |
| laser irradiation angle in sub-scanning cross section (deg) | αsA | −3 |
| refractive index of coupling lens 3A | n3A | 1.762 |
| refractive index of cylindrical lens 4A | n4 | 1.524 |
| refractive index of imaging lens 6 | n6 | 1.524 |
| refractive index of first imaging portion 7A | n7A | 1.524 |
| coordinate of rotation axis of polygon mirror (mm) defining deflection point on axis as (0, 0, 0) | X direction | −5.683 |
| | Y direction | 4.315 |
| Kθ coefficient (mm/rad) | K | 132.20 |
| circumscribed circle diameter (mm) | Rp | φ20 |
| number of surfaces of polygon mirror | MEN | 4 |
| maximum scanning field angle (deg) | θmax | 47.7 |
| stop diameter of aperture stop 2A (mm) (aperture has rectangular shape) | Y direction | 1.92 |
| | Z direction | 2.08 |
| effective scanning width (mm) | W | 210 |
| distance from rear principal plane of imaging optical system A to scanned surface in main scanning cross section (mm) | Sk | 130.467 |
| focal length of imaging optical system A in main scanning cross section (mm) | f | 136.966 |
| convergence (1 − Sk/f) | ma | 0.047 |
| optical path length of imaging optical system A (mm) (distance from deflection surface to scanned surface) | Ta | 155.733 |
| sub-scanning cross magnification in imaging optical system A (times) | βa | −2.29 |
| reflection angle of mirror M3 (deg) | γ3 | 44.8 |
| resolution in main scanning direction (dpi) | Dpi_m | 600 |
| resolution in sub-scanning direction (dpi) | Dpi_s | 600 |

TABLE 1-continued

Optical Arrangement

| | | origin of each surface | | | optical axis direction (expressed in direction cosine) | | |
|---|---|---|---|---|---|---|---|
| | | X coordinate | Y coordinate | Z coordinate | X component | Y component | Z component |
| light source 1A | | 0.000 | −113.844 | 5.966 | 0.000 | −0.999 | 0.052 |
| aperture stop 2A | | 0.000 | −97.866 | 5.129 | 0.000 | −0.999 | 0.052 |
| coupling lens 3A | incident surface | 0.000 | −95.548 | 5.007 | 0.000 | −0.999 | 0.052 |
| | light emitting surface | 0.000 | −92.552 | 4.850 | 0.000 | −0.999 | 0.052 |
| cylindrical lens 4A | incident surface | 0.000 | −79.770 | 4.181 | 0.000 | −0.999 | 0.052 |
| | light emitting surface | 0.000 | −76.774 | 4.024 | 0.000 | −0.999 | 0.052 |
| polygon mirror 5 | deflection surface 5a (deflection point on axis) | 0.000 | 0.000 | 0.000 | — | — | — |
| imaging lens 6 | incident surface | 0.000 | −0.237 | 0.000 | 1.000 | 0.000 | 0.000 |
| | light emitting surface | 17.200 | −0.237 | 0.000 | 1.000 | 0.000 | 0.000 |
| first imaging portion 7A | incident surface | 39.200 | −0.237 | −2.240 | 1.000 | 0.000 | 0.000 |
| | light emitting surface | 44.200 | −0.237 | −2.240 | 1.000 | 0.000 | 0.000 |
| mirror M3 | reflection surface | 94.817 | −0.237 | −2.785 | 0.709 | 0.000 | 0.705 |
| scanned surface 8A | | 94.817 | −0.237 | −63.702 | 0.000 | 0.000 | 1.000 |

A surface vertex position is expressed by coordinates when defining a deflection point on axis as (X, Y, Z) = (0, 0, 0) (unit: mm)

TABLE 2

| | | coupling lens 3A | | cylindrical lens 4A | | imaging lens 6 | | first imaging portion 7A | |
|---|---|---|---|---|---|---|---|---|---|
| | | incident surface | light emitting surface | incident surface | light emitting surface | incident surface | light emitting surface | incident surface | light emitting surface |
| | | | | | Main Scanning Direction | | | | |
| | R | ∞ | −15.1268 | ∞ | ∞ | −3.8143E+01 | −2.3021E+01 | −2.8381E+02 | 3.4460E+02 |
| | K | — | — | 0.0000E+00 | — | −3.9315E−01 | −2.0156E+00 | −4.7798E+02 | −4.3345E+02 |
| UPPER | B2_u | — | — | 0.0000E+00 | — | 0.0000E+00 | 0.0000E+00 | 0.0000E+00 | 0.0000E+00 |
| | B4_u | — | — | 0.0000E+00 | — | 6.2445E−06 | −4.4448E−06 | −8.4788E−07 | −3.9588E−06 |
| | B6_u | — | — | 0.0000E+00 | — | 5.8484E−09 | 1.2596E−08 | −2.9764E−10 | 1.5800E−09 |
| | B8_u | — | — | 0.0000E+00 | — | 0.0000E+00 | 0.0000E+00 | 2.8417E−13 | −6.5716E−13 |
| | B10_u | — | — | 0.0000E+00 | — | 0.0000E+00 | 0.0000E+00 | −4.7841E−17 | 1.3602E−16 |
| | B12_u | — | — | 0.0000E+00 | — | 0.0000E+00 | 0.0000E+00 | 0.0000E+00 | 0.0000E+00 |
| LOWER | B2_l | — | — | 0.0000E+00 | — | 0.0000E+00 | 0.0000E+00 | 0.0000E+00 | 0.0000E+00 |
| | B4_l | — | — | 0.0000E+00 | — | 6.2445E−06 | −4.4448E−06 | −8.4788E−07 | −3.9588E−06 |
| | B6_l | — | — | 0.0000E+00 | — | 5.8484E−09 | 1.2596E−08 | −2.9764E−10 | 1.5800E−09 |
| | B8_l | — | — | 0.0000E+00 | — | 0.0000E+00 | 0.0000E+00 | 2.8417E−13 | −6.5716E−13 |
| | B10_l | — | — | 0.0000E+00 | — | 0.0000E+00 | 0.0000E+00 | −4.7841E−17 | 1.3602E−16 |
| | B12_l | — | — | 0.0000E+00 | — | 0.0000E+00 | 0.0000E+00 | 0.0000E+00 | 0.0000E+00 |
| | | | | | Sub-Scanning Direction | | | | |
| | r | ∞ | −15.2164 | 5.8621E+01 | ∞ | 5.0000E+01 | 1.6137E+01 | 7.5577E+01 | −1.5806E+01 |
| UPPER | E2_u | — | — | 0.0000E+00 | — | 0.0000E+00 | −4.0637E−05 | 4.1143E−05 | 7.3011E−05 |
| | E4_u | — | — | 0.0000E+00 | — | 0.0000E+00 | −7.2436E−08 | −1.6428E−07 | −1.4637E−07 |
| | E6_u | — | — | 0.0000E+00 | — | 0.0000E+00 | 9.1894E−11 | 2.3347E−10 | 1.3990E−10 |
| | E8_u | — | — | 0.0000E+00 | — | 0.0000E+00 | 0.0000E+00 | −1.1872E−13 | −3.8232E−14 |
| | E10_u | — | — | 0.0000E+00 | — | 0.0000E+00 | 0.0000E+00 | 9.3050E−18 | −7.4921E−18 |
| LOWER | E2_l | — | — | 0.0000E+00 | — | 0.0000E+00 | −4.0637E−05 | 4.1143E−05 | 7.3011E−05 |
| | E4_l | — | — | 0.0000E+00 | — | 0.0000E+00 | −7.2436E−08 | −1.9957E−07 | −1.8930E−07 |
| | E6_l | — | — | 0.0000E+00 | — | 0.0000E+00 | 9.1894E−11 | 3.2361E−10 | 2.5681E−10 |
| | E8_l | — | — | 0.0000E+00 | — | 0.0000E+00 | 0.0000E+00 | −2.8241E−13 | −1.9457E−13 |
| | E10_l | — | — | 0.0000E+00 | — | 0.0000E+00 | 0.0000E+00 | 9.2721E−17 | 5.5617E−17 |
| | m0_l | — | — | 0.0000E+00 | — | 0.0000E+00 | 0.0000E+00 | 6.5129E−02 | −5.5854E−02 |
| UPPER | m2_1_u | — | — | 0.0000E+00 | — | 0.0000E+00 | 0.0000E+00 | 1.1210E−05 | 7.3277E−05 |
| | m4_1_u | — | — | 0.0000E+00 | — | 0.0000E+00 | 0.0000E+00 | 5.2648E−08 | −3.0515E−08 |
| | m6_1_u | — | — | 0.0000E+00 | — | 0.0000E+00 | 0.0000E+00 | −1.2745E−10 | 1.3199E−11 |
| | m8_1_u | — | — | 0.0000E+00 | — | 0.0000E+00 | 0.0000E+00 | 5.0799E−14 | −5.1954E−14 |
| | m10_1_u | — | — | 0.0000E+00 | — | 0.0000E+00 | 0.0000E+00 | 1.1301E−17 | 3.1990E−17 |
| | m12_1_u | — | — | 0.0000E+00 | — | 0.0000E+00 | 0.0000E+00 | 0.0000E+00 | 0.0000E+00 |
| | m14_1_u | — | — | 0.0000E+00 | — | 0.0000E+00 | 0.0000E+00 | 0.0000E+00 | 0.0000E+00 |
| | m16_1_u | — | — | 0.0000E+00 | — | 0.0000E+00 | 0.0000E+00 | 0.0000E+00 | 0.0000E+00 |
| LOWER | m2_1_l | — | — | 0.0000E+00 | — | 0.0000E+00 | 0.0000E+00 | −3.1564E−06 | 5.5140E−05 |
| | m4_1_l | — | — | 0.0000E+00 | — | 0.0000E+00 | 0.0000E+00 | −4.5842E−08 | −6.1096E−08 |
| | m6_1_l | — | — | 0.0000E+00 | — | 0.0000E+00 | 0.0000E+00 | 6.9331E−11 | 3.1353E−11 |
| | m8_1_l | — | — | 0.0000E+00 | — | 0.0000E+00 | 0.0000E+00 | −3.7376E−14 | 1.3154E−14 |
| | m10_1_l | — | — | 0.0000E+00 | — | 0.0000E+00 | 0.0000E+00 | −4.8091E−18 | −1.8027E−17 |
| | m12_1_l | — | — | 0.0000E+00 | — | 0.0000E+00 | 0.0000E+00 | 0.0000E+00 | 0.0000E+00 |
| | m14_1_l | — | — | 0.0000E+00 | — | 0.0000E+00 | 0.0000E+00 | 0.0000E+00 | 0.0000E+00 |
| | m16_1_l | — | — | 0.0000E+00 | — | 0.0000E+00 | 0.0000E+00 | 0.0000E+00 | 0.0000E+00 |

TABLE 2-continued

| | | coupling lens 3A | | cylindrical lens 4A | | imaging lens 6 | | first imaging portion 7A | |
|---|---|---|---|---|---|---|---|---|---|
| | | incident surface | light emitting surface | incident surface | light emitting surface | incident surface | light emitting surface | incident surface | light emitting surface |
| additional shape | C3 | — | — | 0.0000E+00 | −2.0000E−03 | 0.0000E+00 | 0.0000E+00 | 0.0000E+00 | 0.0000E+00 |

TABLE 3

| Specification | | Value |
|---|---|---|
| laser wavelength (nm) | $\lambda$ | 790 |
| laser irradiation angle in main scanning cross section (deg) | $\alpha m$ | 90 |
| laser irradiation angle in sub-scanning cross section (deg) | $\alpha sB$ | 3 |
| refractive index of coupling lens 3B | n3 | 1.762 |
| refractive index of cylindrical lens 4B | n4 | 1.524 |
| refractive index of imaging lens 6 | n6 | 1.524 |
| refractive index of second imaging portion 7B | n7B | 1.524 |
| coordinate of rotation axis of polygon mirror (mm) defining deflection point on axis as (0, 0, 0) | X direction | −5.683 |
| | Y direction | 4.315 |
| K$\theta$ coefficient (mm/rad) | K | 167.00 |
| circumscribed circle diameter (mm) | Rp | $\phi$20 |
| number of surfaces of polygon mirror | MEN | 4 |
| maximum scanning field angle (deg) | $\theta$max | 37.7 |
| stop diameter of aperture stop 2B (mm) (aperture has rectangular shape) | Y direction | 2.00 |
| | Z direction | 2.74 |
| effective scanning width (mm) | W | 210 |
| distance from rear principal plane of imaging optical system B to scanned surface in main scanning cross section (mm) | Sk | 171.734 |
| focal length of imaging optical system B in main scanning cross section (mm) | f | 136.966 |
| convergence (1 − Sk/f) | mb | −0.254 |
| optical path length of imaging optical system B (mm) (distance from deflection surface to scanned surface) | Tb | 197 |
| sub-scanning cross magnification in imaging optical system B (times) | $\beta b$ | −3.07 |
| reflection angle of mirror M1 (deg) | $\gamma 1$ | −4.8 |
| reflection angle of mirror M2 (deg) | $\gamma 2$ | −50.0 |
| resolution in main scanning direction (dpi) | Dpi_m | 600 |
| resolution in sub-scanning direction (dpi) | Dpi_s | 600 |

Optical Arrangement

| | | origin of each surface | | | optical axis direction (expressed in direction cosine) | | |
|---|---|---|---|---|---|---|---|
| | | X coordinate | Y coordinate | Z coordinate | X component | Y component | Z component |
| light source 1B | | 0.000 | −113.844 | −5.966 | 0.000 | −0.999 | −0.052 |
| aperture stop 2B | | 0.000 | −97.866 | −5.129 | 0.000 | −0.999 | −0.052 |
| coupling lens 3B | incident surface | 0.000 | −95.548 | −5.007 | 0.000 | −0.999 | −0.052 |
| | light emitting surface | 0.000 | −92.552 | −4.850 | 0.000 | −0.999 | −0.052 |
| cylindrical lens 4B | incident surface | 0.000 | −79.770 | −4.181 | 0.000 | −0.999 | −0.052 |
| | light emitting surface | 0.000 | −76.774 | −4.024 | 0.000 | −0.999 | −0.052 |
| polygon mirror 5 | deflection surface 5a (deflection point on axis) | 0.000 | 0.000 | 0.000 | — | — | — |
| imaging lens 6 | incident surface | 17.200 | −0.237 | 0.000 | 1.000 | 0.000 | 0.000 |
| | light emitting surface | 23.200 | −0.237 | 0.000 | 1.000 | 0.000 | 0.000 |
| second imaging portion 7B | incident surface | 39.200 | −0.237 | 2.240 | 1.000 | 0.000 | 0.000 |
| | light emitting surface | 44.200 | −0.237 | 2.240 | 1.000 | 0.000 | 0.000 |
| mirror M1 | reflection surface | 74.703 | 0.000 | 2.672 | 0.996 | 0.000 | −0.084 |
| mirror M2 | reflection surface | 27.817 | 0.000 | 10.937 | 0.643 | 0.000 | −0.766 |
| scanned surface 8B | | 27.817 | −0.237 | −63.702 | 0.000 | 0.000 | −1.000 |

A surface vertex position is expressed by coordinates when defining a deflection point on axis as (X, Y, Z) = (0, 0, 0) (unit: mm)

TABLE 4

| | | coupling lens 3B | | cylindrical lens 4B | | imaging lens 6 | | second imaging portion 7B | |
|---|---|---|---|---|---|---|---|---|---|
| | | incident surface | light emitting surface | incident surface | light emitting surface | incident surface | light emitting surface | incident surface | light emitting surface |
| | | | | | Main Scanning Direction | | | | |
| | R | ∞ | −15.8362 | ∞ | ∞ | −3.8143E+01 | −2.3021E+01 | −2.8381E+02 | 3.4460E+02 |
| | K | — | — | 0.0000E+00 | — | −3.9315E−01 | −2.0156E+00 | −4.7798E+02 | −4.3345E+02 |
| UPPER | B2_u | — | — | 0.0000E+00 | — | 0.0000E+00 | 0.0000E+00 | 0.0000E+00 | 0.0000E+00 |
| | B4_u | — | — | 0.0000E+00 | — | 6.2445E−06 | −4.4448E−06 | −1.6855E−07 | −3.3155E−06 |
| | B6_u | — | — | 0.0000E+00 | — | 5.8484E−09 | 1.2596E−08 | −9.2369E−10 | 1.3461E−09 |
| | B8_u | — | — | 0.0000E+00 | — | 0.0000E+00 | 0.0000E+00 | 4.7087E−13 | −7.1570E−13 |
| | B10_u | — | — | 0.0000E+00 | — | 0.0000E+00 | 0.0000E+00 | 0.0000E+00 | 2.2034E−16 |
| | B12_u | — | — | 0.0000E+00 | — | 0.0000E+00 | 0.0000E+00 | 0.0000E+00 | 0.0000E+00 |
| LOWER | B2_l | — | — | 0.0000E+00 | — | 0.0000E+00 | 0.0000E+00 | 0.0000E+00 | 0.0000E+00 |
| | B4_l | — | — | 0.0000E+00 | — | 6.2445E−06 | −4.4448E−06 | −1.6855E−07 | −3.3155E−06 |
| | B6_l | — | — | 0.0000E+00 | — | 5.8484E−09 | 1.2596E−08 | −9.2369E−10 | 1.3461E−09 |
| | B8_l | — | — | 0.0000E+00 | — | 0.0000E+00 | 0.0000E+00 | 4.7087E−13 | −7.1570E−13 |
| | B10_l | — | — | 0.0000E+00 | — | 0.0000E+00 | 0.0000E+00 | 0.0000E+00 | 2.2034E−16 |
| | B12_l | — | — | 0.0000E+00 | — | 0.0000E+00 | 0.0000E+00 | 0.0000E+00 | 0.0000E+00 |
| | | | | | Sub-Scanning Direction | | | | |
| | r | ∞ | −15.2164 | 5.8621E+01 | ∞ | 5.0000E+01 | 1.6137E+01 | 9.3012E+01 | −1.6496E+01 |
| UPPER | E2_u | — | — | 0.0000E+00 | — | 0.0000E+00 | −4.0637E−05 | 6.4508E−05 | 8.8221E−05 |
| | E4_u | — | — | 0.0000E+00 | — | 0.0000E+00 | −7.2436E−08 | −1.8984E−07 | −1.5735E−07 |
| | E6_u | — | — | 0.0000E+00 | — | 0.0000E+00 | 9.1894E−11 | 2.4165E−10 | 1.4032E−10 |
| | E8_u | — | — | 0.0000E+00 | — | 0.0000E+00 | 0.0000E+00 | −1.1795E−13 | −3.6560E−14 |
| | E10_u | — | — | 0.0000E+00 | — | 0.0000E+00 | 0.0000E+00 | 9.3050E−18 | −7.4921E−18 |
| LOWER | E2_l | — | — | 0.0000E+00 | — | 0.0000E+00 | −4.0637E−05 | 6.4508E−05 | 8.8221E−05 |
| | E4_l | — | — | 0.0000E+00 | — | 0.0000E+00 | −7.2436E−08 | −2.2405E−07 | −1.9775E−07 |
| | E6_l | — | — | 0.0000E+00 | — | 0.0000E+00 | 9.1894E−11 | 3.3095E−10 | 2.5121E−10 |
| | E8_l | — | — | 0.0000E+00 | — | 0.0000E+00 | 0.0000E+00 | −2.7455E−13 | −1.8581E−13 |
| | E10_l | — | — | 0.0000E+00 | — | 0.0000E+00 | 0.0000E+00 | 9.2721E−17 | 5.5617E−17 |
| | m0_1 | — | — | 0.0000E+00 | — | 0.0000E+00 | 0.0000E+00 | 6.5129E−02 | −5.5854E−02 |
| UPPER | m2_1_u | — | — | 0.0000E+00 | — | 0.0000E+00 | 0.0000E+00 | 7.8946E−06 | 6.8514E−05 |
| | m4_1_u | — | — | 0.0000E+00 | — | 0.0000E+00 | 0.0000E+00 | 3.8108E−08 | −3.1322E−08 |
| | m6_1_u | — | — | 0.0000E+00 | — | 0.0000E+00 | 0.0000E+00 | −1.1148E−10 | 9.6611E−12 |
| | m8_1_u | — | — | 0.0000E+00 | — | 0.0000E+00 | 0.0000E+00 | 5.2353E−14 | −4.5267E−14 |
| | m10_1_u | — | — | 0.0000E+00 | — | 0.0000E+00 | 0.0000E+00 | 1.0469E−17 | 3.1862E−17 |
| | m12_1_u | — | — | 0.0000E+00 | — | 0.0000E+00 | 0.0000E+00 | 0.0000E+00 | 0.0000E+00 |
| | m14_1_u | — | — | 0.0000E+00 | — | 0.0000E+00 | 0.0000E+00 | 0.0000E+00 | 0.0000E+00 |
| | m16_1_u | — | — | 0.0000E+00 | — | 0.0000E+00 | 0.0000E+00 | 0.0000E+00 | 0.0000E+00 |
| LOWER | m2_1_l | — | — | 0.0000E+00 | — | 0.0000E+00 | 0.0000E+00 | −6.1463E−06 | 5.1154E−05 |
| | m4_1_l | — | — | 0.0000E+00 | — | 0.0000E+00 | 0.0000E+00 | −5.8312E−08 | −6.3996E−08 |
| | m6_1_l | — | — | 0.0000E+00 | — | 0.0000E+00 | 0.0000E+00 | 7.8929E−11 | 3.0974E−11 |
| | m8_1_l | — | — | 0.0000E+00 | — | 0.0000E+00 | 0.0000E+00 | −3.4393E−14 | 1.6293E−14 |
| | m10_1_l | — | — | 0.0000E+00 | — | 0.0000E+00 | 0.0000E+00 | −9.3746E−18 | −1.9955E−17 |
| | m12_1_l | — | — | 0.0000E+00 | — | 0.0000E+00 | 0.0000E+00 | 0.0000E+00 | 0.0000E+00 |
| | m14_1_l | — | — | 0.0000E+00 | — | 0.0000E+00 | 0.0000E+00 | 0.0000E+00 | 0.0000E+00 |
| | m16_1_l | — | — | 0.0000E+00 | — | 0.0000E+00 | 0.0000E+00 | 0.0000E+00 | 0.0000E+00 |
| additional shape | C3 | — | — | 0.0000E+00 | −2.0000E−03 | 0.0000E+00 | 0.0000E+00 | 0.0000E+00 | 0.0000E+00 |

In the optical axis direction of the imaging optical system SR, a distance from the scanned surface 8B to the reflection point on the first mirror M1 is defined as LD1, and a distance from the scanned surface 8A to the reflection point on the first mirror M1 is defined as LD2. In this regard, each component is arranged to satisfy the condition LD1>LD2, more specifically to satisfy that LD1 and LD2 are respectively 46.886 (mm) and 20.114 (mm), according to the present exemplary embodiment.

According to the optical scanning apparatuses described in the patent literatures 1 to 3, each component needs to be arranged to satisfy LD1<LD2 to equalize an optical path length to each scanned surface with each other, and thus it is difficult to downsize the entire apparatus while avoiding interference of the light beam Rb with the imaging lens 7. In contrast, according to the present exemplary embodiment, each component can be arranged to satisfy the condition LD1>LD2 by making the optical path length corresponding to the imaging optical system SB longer than the optical path length corresponding to the imaging optical system SA. In other words, the reflection point of the light beam Rb on the first mirror M1 can be brought closer to the scanned surface 8A than the scanned surface 8B, and thus the above-described issue can be solved.

In the optical axis direction of the imaging optical system SR, a distance from the light emitting surface of the imaging lens 7 to the reflection point on the first mirror M1 is defined as LM1, and a distance from the reflection point on the first mirror M1 to the scanned surface 8A is defined as LM2. In this regard, each component is arranged to satisfy the condition LM1>LM2, more specifically to satisfy that LM1 and LM2 are respectively 30.503 (mm) and 20.114 (mm), according to the present exemplary embodiment. Accordingly, the reflection point of the first mirror M1 can be brought closer to the scanned surface 8A than the light emitting surface of the imaging lens 7, and the entire apparatus can be downsized while avoiding interference of the imaging lens 7 with the light beam Rb.

The light emitting surfaces of the cylindrical lenses 4A and 4B according to the present exemplary embodiment are diffractive surfaces on which diffraction gratings are formed. The cylindrical lenses 4A and 4B are formed by injection molding using a plastic material and form a temperature compensation optical system which compensates a change in a refraction power caused by an environmental variation with a change in a diffraction power caused by a wavelength variation of the semiconductor laser. When a diffraction order is defined as M, and a designed wavelength is defined as λ, diffractive surfaces of the cylindrical lenses 4A and 4B are defined by a phase function φ=2πM/λ(C3Z2). According to the present exemplary embodiment, the first order diffracted light is used, and thus the diffraction order is given as M=1, and the designed wavelength is given as λ=790 nm. Z is a position of the Z direction in FIG. 3, and C3 is a coefficient.

Meridional line shapes (a shape in the main scanning cross section) of the incident surfaces and the light emitting surfaces of the imaging lenses 6, 7A, and 7B according to the present exemplary embodiment are all aspherical shapes expressed by functions up to twelfth order. When an intersection point of each lens surface (an optical surface) and each optical axis is defined as a point of origin, an axis in the optical axis direction is defined as the X axis, and an axis perpendicular to the X axis in the main scanning cross section is defined as the Y axis, a meridional line shape X is expressed by a following expression.

$$X = \frac{Y^2/R}{1+(1-(1+K)(Y/R)^2)^{1/2}} + B_4Y^4 + B_6Y^6 + B_8Y^8 + B_{10}Y^{10} + B_{12}Y^{12}$$ [Expression 1]

Here, R is a curvature radius (a curvature radius of the meridional line) in the main scanning cross section, and K, B4, B6, B8, B10, and B12 are aspherical coefficients. The aspherical coefficients B4, B6, B8, and B12 may be respectively different on an opposite side of the light source (+Y side in FIG. 2) and on the light source side (−Y side in FIG. 2) with respect to the optical axis of the optical scanning apparatus 100. Accordingly, the meridional line shape can be asymmetrical with respect to the optical axis in the main scanning direction. In Tables 2 and 4, values on the opposite side of the light source with respect to the optical axis are B4U, B6U, B8U, B10U, B12U, values on the light source side with respect to the optical axis are B4L, B6L, B8L, B10L, and B12L, and these values are set to the same values.

Sagittal line shapes (a shape in the sub-scanning cross section) of the incident surface and the light emitting surface of the imaging lenses 6, 7A, and 7B according to the present exemplary embodiment is expressed by a following expression.

$$S = \frac{Z^2/r'}{1+\sqrt{1-\left(\frac{Z}{r'}\right)^2}} + \sum_{i,j} m_{jk}Y^jZ^k$$ [Expression 2]

A sagittal line shape S is a surface shape in a cross section perpendicular to the main scanning cross section including a surface normal on the meridional line at each position (each image height) in the main scanning direction, and Mj_k in the expression is the aspherical coefficient. r' is a curvature radius (a curvature radius of the sagittal line) in the sub-scanning cross section at a position away a distance Y from the optical axis in the main scanning direction and expressed by a following expression.

$$\frac{1}{r'} = \frac{1}{r} + E_2Y^2 + E_4Y^4 + E_6Y^6 + E_8Y^8 + E_{10}Y^{10}$$ [Expression 3]

Here, r is the curvature radius of the sagittal line on the optical axis, and E2, E4, E6, E8, and E10 are sagittal line change coefficients. When the aspherical coefficients E2 to E10 are differentiated on the light source side and on the opposite side with respect to the optical axis, an amount of the aspheric surface of the sagittal line shape can be set to asymmetrical in the main scanning direction. A term of a first degree in the expression of the sagittal line shape S contributes to a tilt amount (a sagittal line tilt amount) of the lens surface in the sub-scanning cross section. Thus, regarding the aspherical coefficients M0_1 to M16_1, when values M0_1U to M16_1U on the opposite side of the light source with respect to the optical axis are differentiated from values of M0_1L to M16_1L on the light source side with respect to the optical axis side, the sagittal line tilt amount can be asymmetrically changed in the main scanning direction.

Regarding the imaging lens 7 according to the present exemplary embodiment, as shown in Tables 2 and 4, the meridional line shape and the sagittal line shape (a curvature of the sagittal line and the sagittal line tilt amount) are differentiated in the first imaging portion 7A and the second imaging portion 7B. As described above, the aspherical coefficients regarding the first optical surface and the second optical surface constituting the multistage lens surface included in the imaging lens 7 are differentiated from each other to optimize the respective surface shapes, and thus the optical characteristics of the imaging optical systems SA and SB of which optical paths are different from each other can be individually corrected.

According to the present exemplary embodiment, the first optical surface included in the first imaging portion 7A and the second optical surface included in the second imaging portion 7B are formed into the surface shapes expressed by the expressions different from each other as shown in Tables 2 and 4, and thus an excellent image forming performance can be obtained in each of the imaging optical systems SA and SB. However, if the shape difference between the first imaging portion 7A and the second imaging portion 7B becomes too large to correspond to the respective optical path lengths different from each other, it is difficult to integrally mold the respective portions.

Thus, according to the present exemplary embodiment, values of the curvature radius of the meridional line R and the aspherical coefficient K are equalized with each other in the first imaging portion 7A and the second imaging portion 7B so as to make shapes near the optical axis (on the optical axis and its periphery) identical in the main scanning direction. Accordingly, the first imaging portion 7A and the second imaging portion 7B can be configured to satisfy the above-described conditional equations (2) and (2a) while reducing the shape difference therebetween, and the excellent image forming performance can be obtained. In a precise sense, the shapes near the optical axis in the main scanning direction are not necessarily identical, and the similar effect can be obtained by constituting the shapes approximately identical. Further, according to the present exemplary embodiment, a shape of each lens surface is defined by the above-described expressions (functions).

However, it is not limited to these expressions, and the shape may be defined by other expressions.

FIGS. 4A and 4B are graphs illustrating field curvature (defocus characteristics) in the main scanning direction and the sub-scanning direction according to the present exemplary embodiment. FIG. 4A corresponds to the light beam Ra, and FIG. 4B corresponds to the light beam Rb. According to the present exemplary embodiment, an effective width of an image (a width of an effective scanning area on the scanned surface) is given as W=210 mm. As illustrated in FIG. 4A, regarding the imaging optical system SA, the field curvature in the main scanning direction is given as dm=1.8 mm, and the field curvature in the sub-scanning direction is given as ds=1.1 mm. As illustrated in FIG. 4B, regarding the imaging optical system SB, the field curvature in the main scanning direction is given as dm=2.0 mm, and the field curvature in the sub-scanning direction is given as ds=1.6 mm. Accordingly, it can be understood that the field curvature are appropriately corrected in both of the imaging optical systems SA and SB.

Figure 5A:
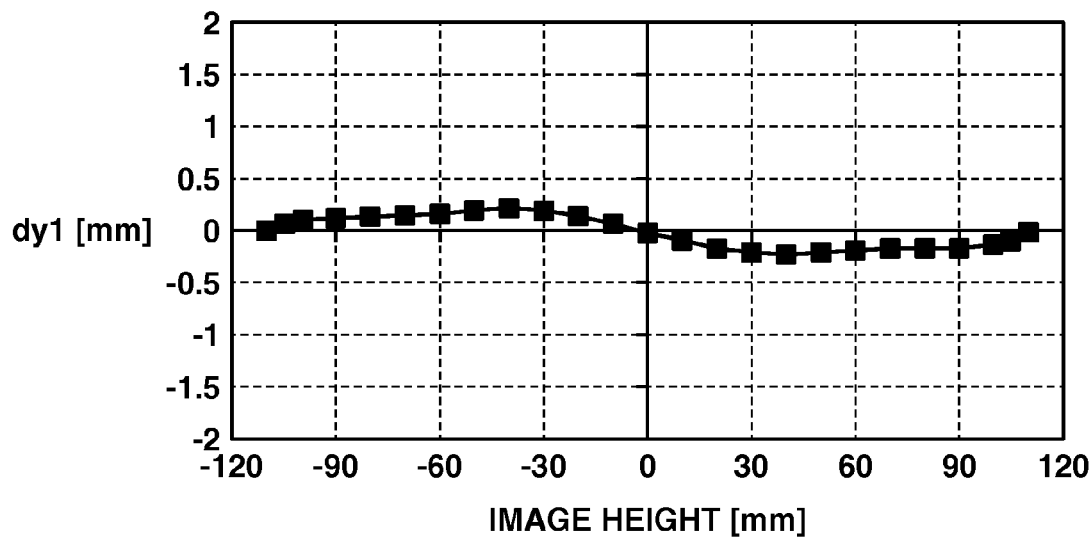
FIGS. 5A and 5B illustrate fθ characteristics according to the first exemplary embodiment of the present invention.
Figure 5B:
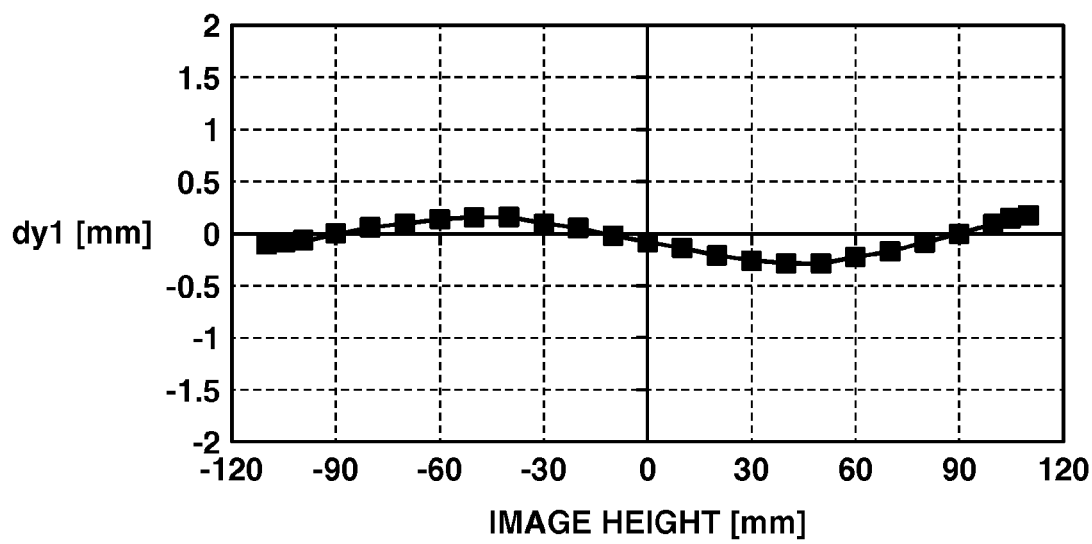

FIGS. 5A and 5B are graphs illustrating fθ characteristics dy1 according to the present exemplary embodiment. FIG. 5A corresponds to the light beam Ra, and FIG. 5B corresponds to the light beam Rb. The fθ characteristic dy1 here indicates a difference between a position (image height) to which the light beam actually reaches on the scanned surface and a design value (ideal image height) thereof. As illustrated in FIG. 5A, a difference in the imaging optical system SA is 0.23 mm at a maximum, and as illustrated in FIG. 5B, a difference in the imaging optical system SB is 0.26 mm at a maximum. Thus, according to the present exemplary embodiment, an image clock (a light emitting timing of the light source) is varied according to each image height, and the difference of the fθ characteristic dy1 is reduced to suppress color displacement in the main scanning direction. A deficient correction of the fθ characteristic may be electrically corrected by changing the image clock, however, if the difference of the fθ characteristic becomes too large, a spot diameter itself in the main scanning direction changes. However, as illustrated in FIGS. 5A and 5B, according to the present exemplary embodiment, the difference of the fθ characteristics to change the spot diameter itself does not occur, and thus occurrence of density unevenness in an image can be suppressed.

Figure 6A:
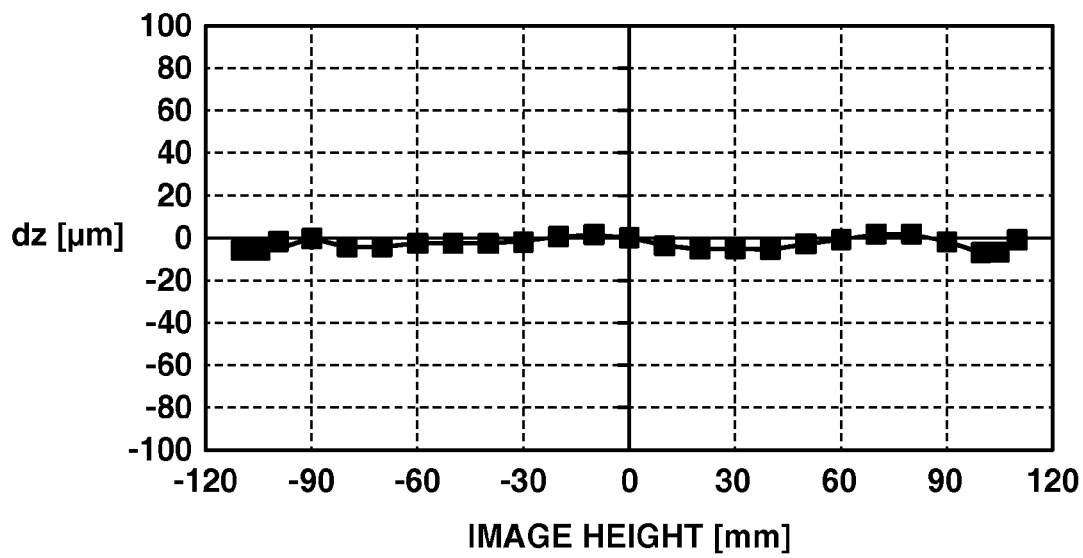
FIGS. 6A and 6B illustrate scanning line bending according to the first exemplary embodiment of the present invention.
Figure 6B:
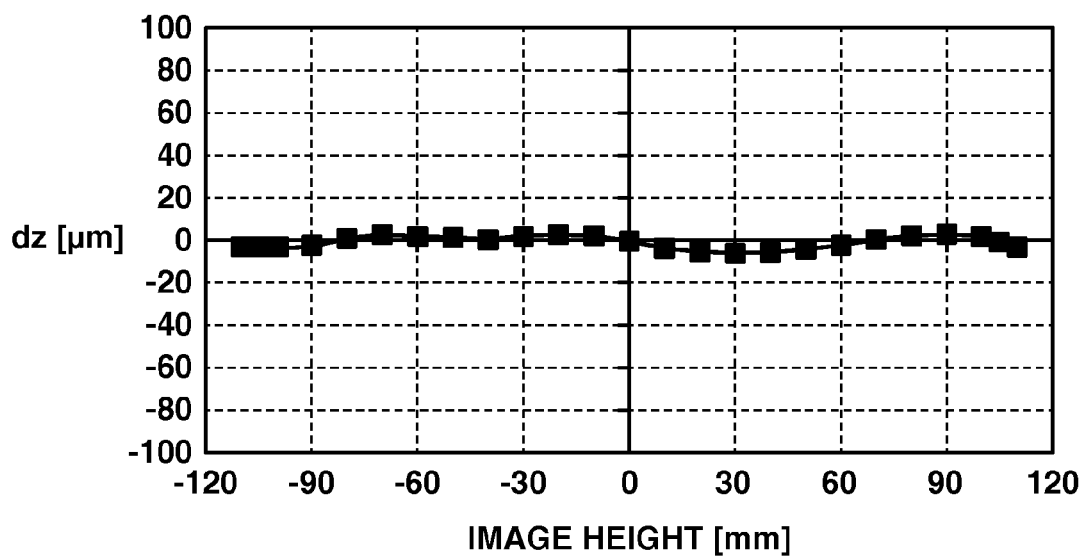

FIGS. 6A and 6B are graphs illustrating scanning line bending dz according to the present exemplary embodiment. FIG. 6A corresponds to the light beam Ra, and FIG. 6B corresponds to the light beam Rb. The scanning line bending dz here indicates a difference between a focus position in the sub-scanning direction at each image height and a focus position in the sub-scanning direction at a center of the image (an axial image height). As illustrated in FIG. 6A, a difference in the imaging optical system SA is 7 μm at a maximum, and as illustrated in FIG. 6B, a difference in the imaging optical system SB is 6 μm at a maximum. However, a level of either difference does not affect an image to be formed.

FIGS. 7A and 7B illustrate cross-sectional shapes of spots at each image height according to the present exemplary embodiment. FIG. 7A corresponds to the light beam Ra, and FIG. 7B corresponds to the light beam Rb. FIGS. 7A and 7B illustrate spot shapes in cross sections sliced at 2%, 5%, 10%, 13.5%, 36.8%, and 50% of the peak light amount of the spot at each image height Y. Normally, in the optical scanning apparatus adopting the sub-scanning oblique incidence optical system, a phenomenon is observed in which a spot is deformed due to a twist of the wavefront aberration.

However, according to the present exemplary embodiment, the power arrangement of each lens surface and the sagittal line tilt amounts of the incident surface and the light emitting surface of the imaging lens 7 are optimized, and thus the scanning line bending and the twist of the wavefront aberration are both corrected.

Accordingly, as illustrated in FIGS. 7A and 7B, fine spot shapes with less twist can be obtained throughout all image heights. However, according to the present exemplary embodiment, to suppress the difference of the surface shapes between the first imaging portion 7A and the second imaging portion 7B, occurrence of coma aberration at an off-axis image height is allowed within a range not affecting an image. Thus, as illustrated in FIG. 7B, side lobes in the main scanning direction become larger at the image heights Y=−105, −50, 50, and 105. However, a hue of the scanned surface (a photosensitive drum) corresponding to the imaging optical system SB is cyan, and an effect on an image is small compared to the imaging optical system SA corresponding to a photosensitive drum for black.

Figure 8A:
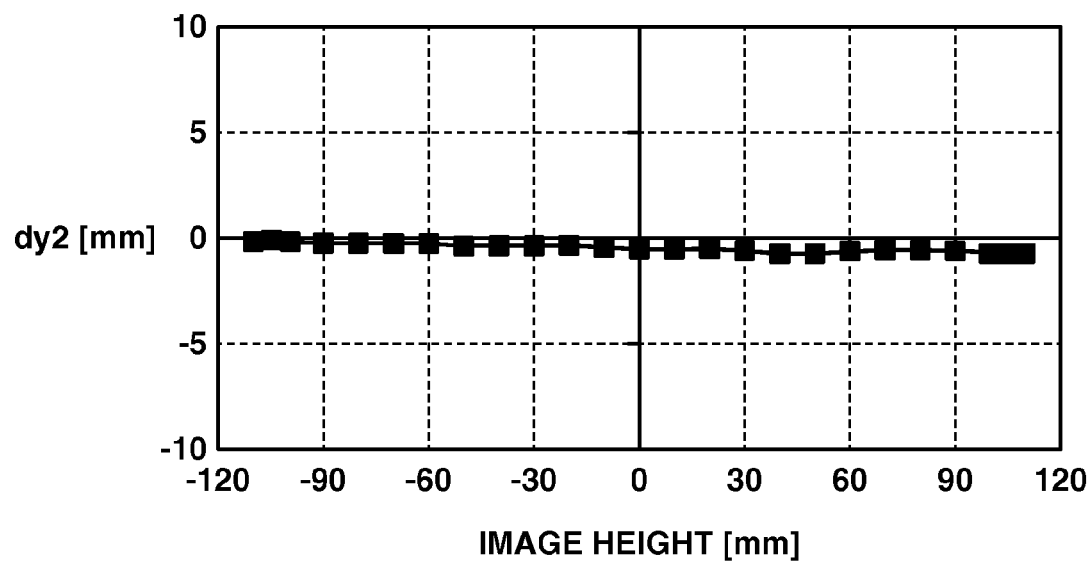
FIGS. 8A and 8B illustrate main scanning jitters according to the first exemplary embodiment of the present invention.
Figure 8B:
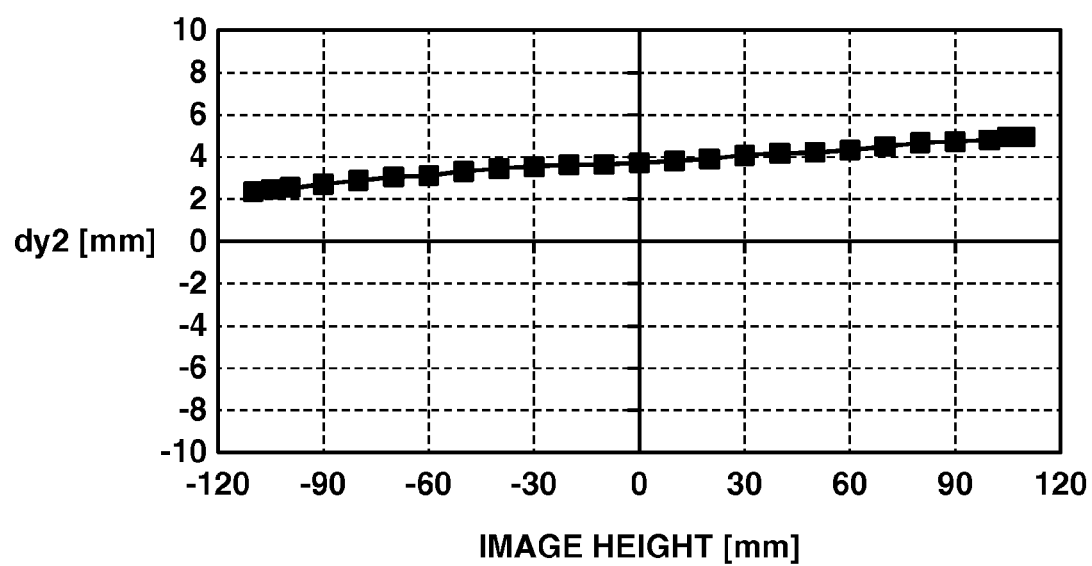

FIGS. 8A and 8B illustrate main scanning jitters dy2 when a shift eccentricity error in the deflection surface is 10 μm. FIG. 8A corresponds to the light beam Ra, and FIG. 8B corresponds to the light beam Rb. As illustrated in FIG. 8A, the main scanning jitter in the imaging optical system SA is 0.8 μm at a maximum, and as illustrated in FIG. 8B, the main scanning jitter in the imaging optical system SB is 5.1 μm at a maximum, so that the jitters can be suppressed to a level causing no problem.

The imaging lens 7 according to the present exemplary embodiment is arranged in such a manner that a center position of the outer shape in the sub-scanning direction coincides with a reference plane P0, and the center position of the outer shape becomes a boundary portion between the first imaging portion 7A and the second imaging portion 7B. In addition, the optical axis of the first imaging portion 7A is set to a position shifted 2.24 mm below from the reference plane P0 in the sub-scanning direction, and the optical axis of the second imaging portion 7B is set to a position shifted 2.24 mm above from the reference plane P0 in the sub-scanning direction. According to the above-described configuration, positions of the respective optical axes to be references of the expressions defining the first and the second optical surfaces can be arranged near the entering positions of the light beams Ra and Rb, so that it becomes easier to associate the surface shape with the image forming performance, and evaluation of the surface shape at the time of molding can be facilitated.

In the first imaging portion 7A and the second imaging portion 7B, intersection points with respective optical axes are defined as surface vertices. In this regard, as shown in Tables 1 and 3, positions of the respective surface vertices of the incident surface and the light emitting surface of the first imaging portion 7A and positions of the respective surface vertices of the incident surface and the light emitting surface of the second imaging portion 7B coincide with each other in the main scanning direction and in the optical axis direction. According to the above-described configuration, the shape difference between the first imaging portion 7A and the second imaging portion 7B near the optical axis can be suppressed to a minimum. In this regard, "coincidence" described here includes "approximate coincidence", and the similar effect can be obtained if the configurations do not precisely coincide with each other.

Figure 9:
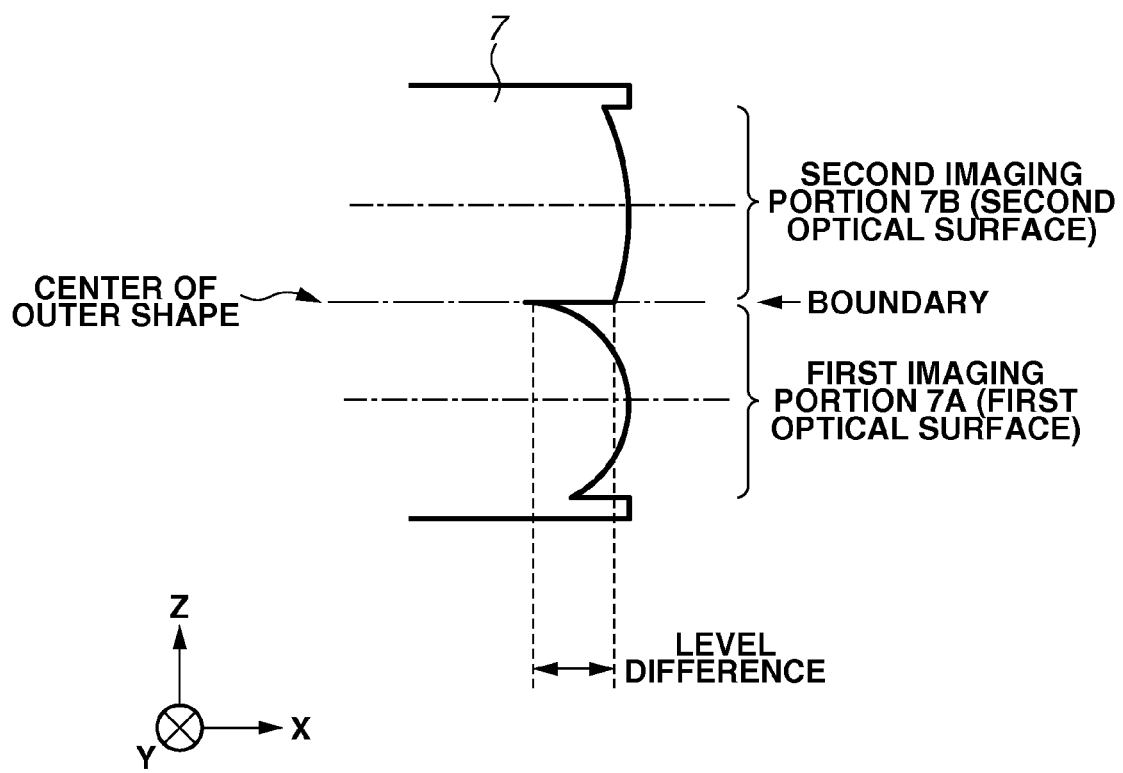
FIG. 9 is a schematic diagram of a multistage lens surface of a multistage lens according to the first exemplary embodiment of the present invention.

FIG. 9 is a schematic diagram (a sub-scanning cross section drawing) illustrating of the boundary portion of the light emitting surface (the multistage lens surface) of the imaging lens 7. In FIG. 9, a scale and a shape are different from the actual ones (which are enlarged and emphasized) to facilitate understanding of the descriptions. According to the present exemplary embodiment, shapes (a curvature and a sagittal line tilt amount in the sub-scanning cross section) of the first optical surface included in the first imaging portion 7A and the second optical surface included in the second imaging portion 7B in the sub-scanning cross section are different from each other in the entire effective area in the main scanning direction. Thus, entering and emitting amounts of the first optical surface and the second optical surface at the boundary portion are different from each other in the sub-scanning cross section at each image height in the main scanning direction, and the boundary portion therebetween will be a discontinuity. In other words, as illustrated in FIG. 9, the first optical surface and the second optical surface are shifted from each other at the boundary portion in the optical axis direction (the X direction), and a level difference is generated therebetween.

Figure 10A:
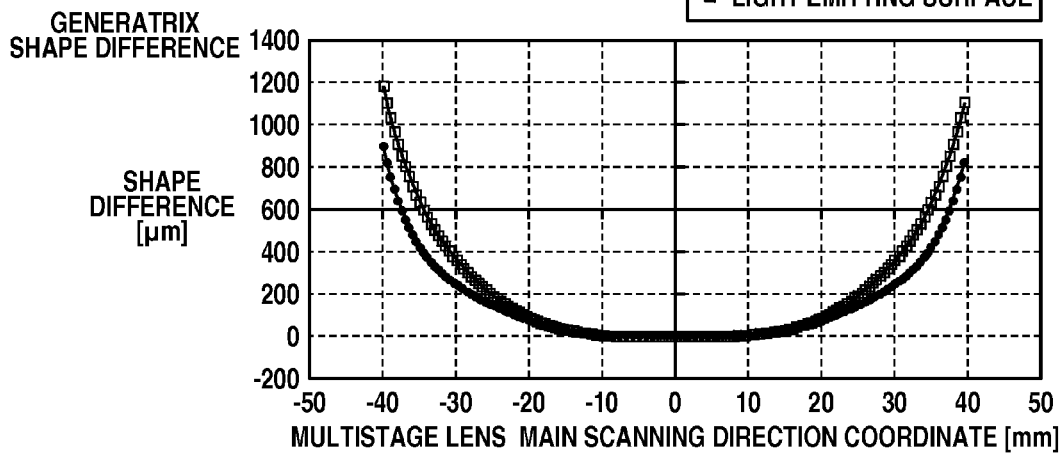
FIGS. 10A to 10C illustrate shapes of an imaging lens 7 according to the first exemplary embodiment of the present invention.

FIG. 10A is a graph illustrating a difference between a meridional line shape of the first optical surface and a meridional line shape of the second optical surface included in the imaging lens 7. In FIG. 10A, a vertical axis indicates a meridional line shape difference, and when a sign of the shape difference is positive, it indicates that the second imaging portion 7B is at a position farther from the deflector than the first imaging portion 7A in the optical axis direction. In addition, when the sign of the shape difference is negative, it indicates that the second imaging portion 7B is at a position closer to the deflector than the first imaging portion 7A. According to the present exemplary embodiment, arrangement and surface shapes of the incident surface and light emitting surface of the imaging lens 7 are respectively set so that the difference between the meridional line shapes of the first imaging portion 7A and the second imaging portion 7B is brought to zero on the optical axis and its periphery. In addition, the meridional line shape of the second optical surface on a side of which optical path length is longer is changed to separate away from the deflector 5 with respect to the first optical surface on a side of which optical path length is shorter toward the end portion from the optical axis in the main scanning direction.

More specifically, when the shape difference between the first imaging portion 7A and the second imaging portion 7B on the optical axis is defined as X(0), it is configured that the shape difference X(0) of the incident surface is 0 (mm), and the shape difference X(0) of the light emitting surface is 0 (mm). Next, when considering off-axis coordinates, for example, −40, −30, +30, and +40 (mm), away from the optical axis in the main scanning direction, the shape difference between the first imaging portion 7A and the second imaging portion 7B at each coordinate is described as follows. The shape difference at each coordinate of the incident surface is given as X(−40)=900 (mm), X(−30)=245 (mm), X(+30)=245 (mm), and X(+40)=825 (mm). Further, the shape difference at each coordinate of the light emitting surface is given as X(−40)=1189 (mm), X(−30)=362 (mm), X(+30)=362 (mm), and X(+40)=1110 (mm).

As described above, according to the present exemplary embodiment, the shapes of the first imaging portion 7A and the second imaging portion 7B are set so as to make the shape difference at the off-axis larger than the shape difference on the optical axis. By changing the difference between the meridional line shapes as described above, the meridional line shape difference can be minimized for obtaining an excellent optical performance in both of the imaging optical systems SA and SB of which optical path lengths are different, and molding of the imaging lens 7 is facilitated. In a precise sense, the difference between the meridional line shapes near the optical axis is not necessarily to be zero, and the similar effect can be obtained by constituting the difference to be approximately zero.

When a maximum value of the surface shape difference between the first optical surface and the second optical surface is defined as Xmax (mm) in the entire area of a light beam using area (an effective area) of the imaging lens 7, it is desirable that Xmax satisfies a following conditional equation (5).

$$0.1 \leq |X\text{max}| \leq 5.0 \tag{5}$$

When a value is greater than a maximum value of the conditional equation (5), the imaging lens 7 warps in the sub-scanning cross section at the time of injection molding, and curvature of a scanning line and the wavefront aberration may be deteriorated. Further, when a value is less than a minimum value of the conditional equation (5), it is difficult to satisfy both of the image forming performances of a main scanning image plane and the fθ characteristic in the imaging optical system SA and the imaging optical system SB. In addition, it is further desirable to satisfy a following conditional equation (5a).

$$0.2 \leq |X\text{max}| \leq 3.0 \tag{5a}$$

According to the present exemplary embodiment, Xmax of the incident surface is 0.90 (mm), Xmax of the light emitting surface is 1.19 (mm), and both values satisfy the conditional equations (5) and (5a). As described above, the convergence ma of the imaging optical system SA and the convergence mb the imaging optical system SB are differentiated from each other so as to bring the scanned surface into focus when the shapes of the first imaging portion 7A and the second imaging portion 7B near the optical axis approximately coincide with each other in the main scanning cross section.

Figure 10B:
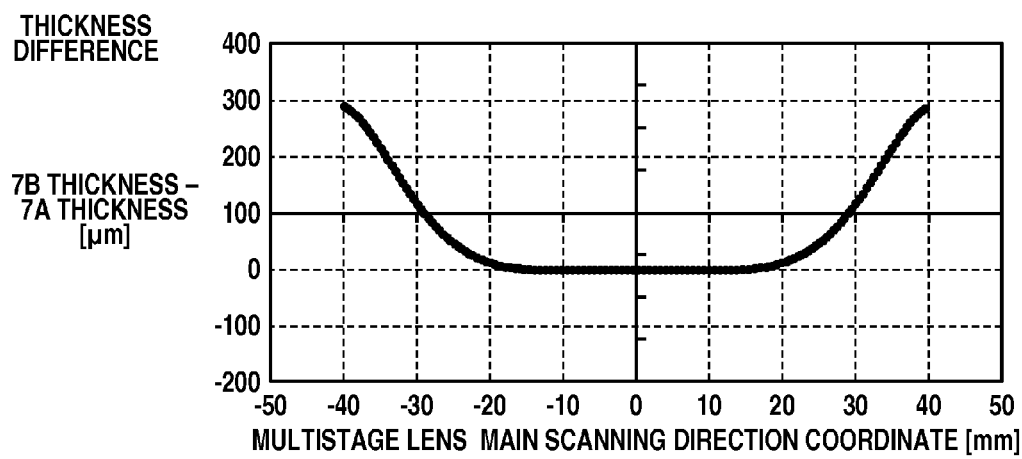

FIG. 10B is a graph illustrating a difference between a thickness of the first imaging portion 7A and a thickness of the second imaging portion 7B. The thickness described here is a distance from the incident surface to the light emitting surface at each position (each image height) of the imaging lens 7 in the main scanning direction According to the present exemplary embodiment, as illustrated in FIG. 10B, a thickness difference near the optical axis is zero, and the thickness of the first imaging portion 7A becomes larger than the thickness of the second imaging portion 7B toward the end portion from the optical axis in the main scanning direction. Since the thickness difference is changed as described above, an effect to strengthen a negative power of the second imaging portion 7B relatively to the first imaging portion 7A toward the end portion from the optical axis in the main scanning direction can be obtained. According to the effect, when a minimum shape difference is provided, the field curvature in the main scanning direction can be appropriately corrected in both of the imaging optical systems SA and SB of which optical paths are different from each other. In a precise sense, the thickness difference near the optical axis is not necessarily to be zero, and the similar effect can be obtained by constituting the difference to be approximately zero.

When a maximum value of the thickness difference between the first imaging portion 7A and the second imaging portion 7B is defined as dmax (mm) in the entire effective area of the imaging lens 7, it is desirable that dmax satisfies a following conditional equation (6).

$$0.05 \leq |d\text{max}| \leq 5.0 \tag{6}$$

When a value is greater than a maximum value of the conditional equation (6), the imaging lens 7 warps in the sub-scanning cross section at the time of injection molding, and the curvature of the scanning line and the wavefront aberration may be deteriorated. Further, when a value is less than a minimum value of the conditional equation (6), it is difficult to satisfy both of the image forming performances of a main scanning image plane and the fθ characteristic in the imaging optical system SA and the imaging optical system SB. In addition, it is further desirable to satisfy a following conditional equation (6a).

$$0.1 \leq |dmax| \leq 4.0 \quad (6a)$$

According to the present exemplary embodiment, dmax is 0.29 (mm), and both of the conditional equations (6) and (6a) are satisfied.

Figure 10C:
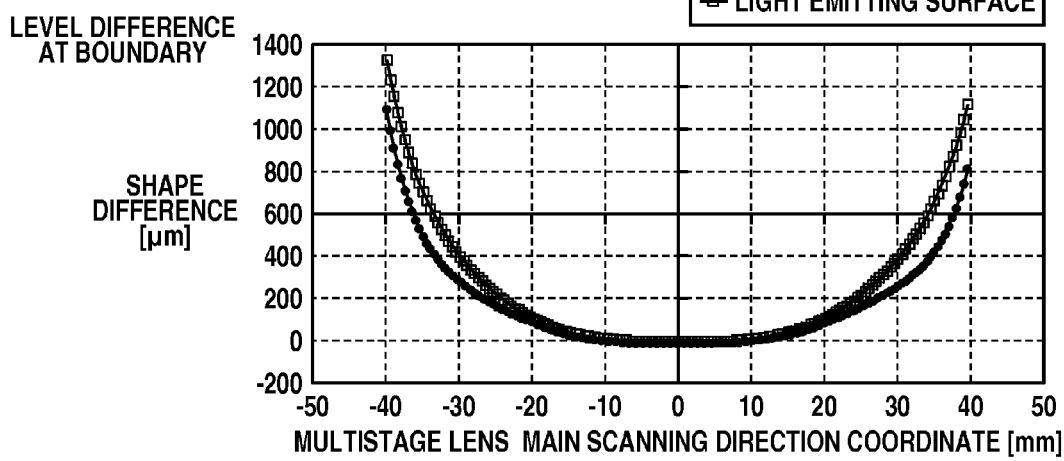

FIG. 10C is a graph illustrating a level difference between the first imaging portion 7A and the second imaging portion 7B at the boundary portion. In FIG. 10C, a vertical axis indicates the level difference at the boundary portion, in other words, a shift (a difference between entering and emitting amounts) between the first optical surface and the second optical surface at the boundary portion in the optical axis direction. When a sign of the level difference is positive, it indicates that the second imaging portion 7B is at a position farther from the deflector than the first imaging portion 7A in the optical axis direction. In addition, when the sign of the level difference is negative, it indicates that the second imaging portion 7B is at a position closer to the deflector than the first imaging portion 7A. As illustrated in FIG. 10C, the level difference is less than or equal to 1400 μm in the entire area of the light beam using area of the imaging lens 7. Thus, occurrence of deformation and tendency of the lens surface due to a stress of thermal deformation near the level difference which is caused by the level difference at the time of injection molding of the imaging lens 7 can be suppressed to a level causing no problem.

In addition, according to the present exemplary embodiment, when a focusing magnification in the sub-scanning cross section of the imaging optical system corresponding to the longer optical path is defined as βs, it is desirable that βs satisfies a following conditional equation (7).

$$2.5 < |\beta s| < 5.0 \quad (7)$$

When a value is greater than a maximum value of the conditional equation (7), deterioration of pitch variation due to the surface tilt and the deficient correction of the wavefront aberration occur. Further, when a value is less than a minimum value of the conditional equation (7), the imaging lens 7 closest to the scanned surface on the optical path gets too close to the scanned surface. As a result, even if the optical path lengths corresponding to the imaging optical system SA and the imaging optical system SB are differentiated from each other, it is difficult to avoid interference of the light beam Rb with the imaging lens 7. In addition, it is further desirable to satisfy a following conditional equation (7a).

$$2.7 < |\beta s| < 4.0 \quad (7a)$$

According to the present exemplary embodiment, the focusing magnification in the sub-scanning cross section of the imaging optical system SA is given as βa=−2.29 (times), the focusing magnification in the sub-scanning cross section of the imaging optical system SB is given as βb=−3.07 (times), and βs=βb is obtained, so that those values satisfy both of the conditional equations (7) and (7a).

As described above, the optical scanning apparatus 100 according to the present exemplary embodiment can sufficiently reduce a height of the sub-scanning direction while reducing the number of components.

Figure 11:
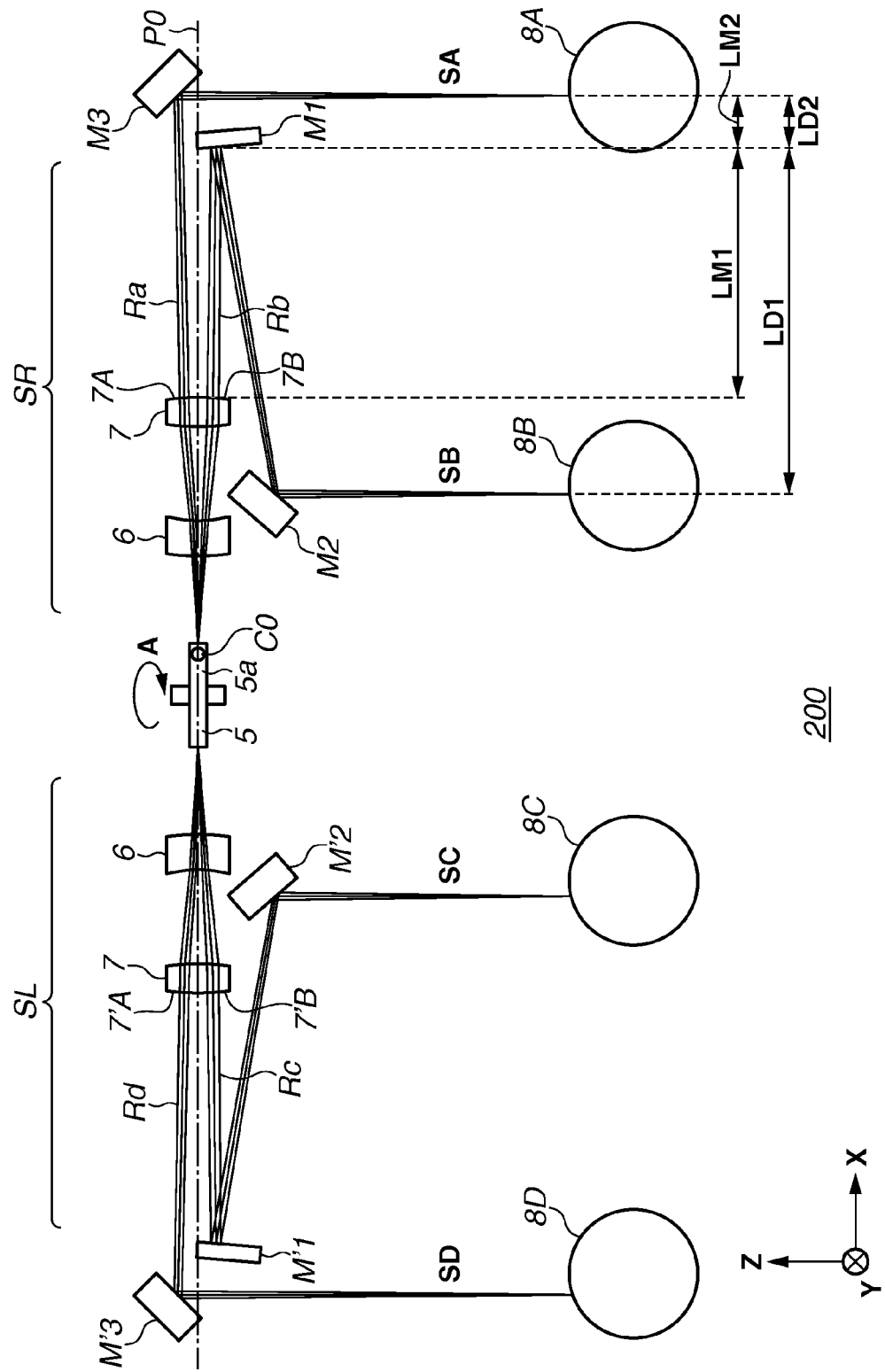
FIG. 11 is a diagrammatic illustration (a sub-scanning cross section drawing) of main parts of an optical scanning apparatus according to a second exemplary embodiment of the present invention.
Figure 12A:
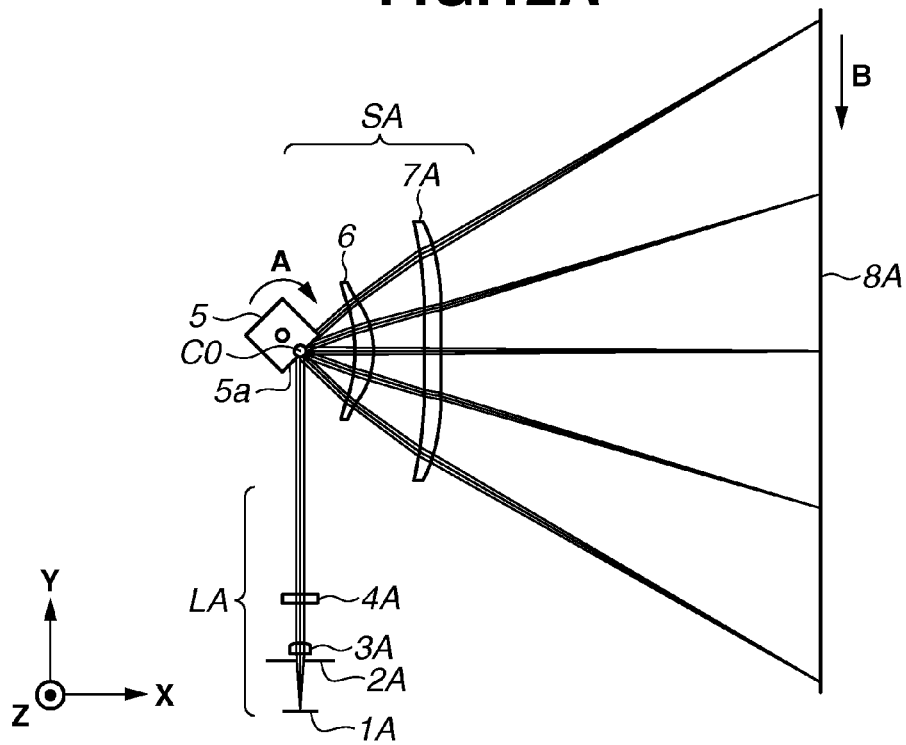
FIGS. 12A and 12B are diagrammatic illustrations (a main scanning cross section drawing) of main parts of the optical scanning apparatus according to the second exemplary embodiment of the present invention.
Figure 12B:
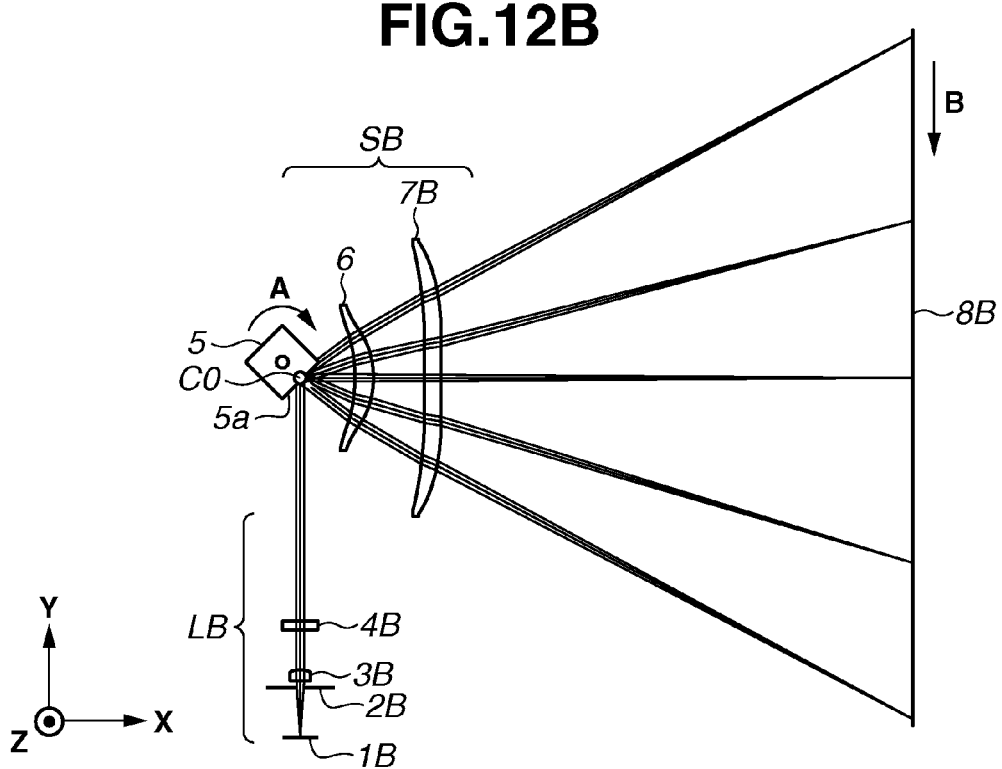
Figure 13:
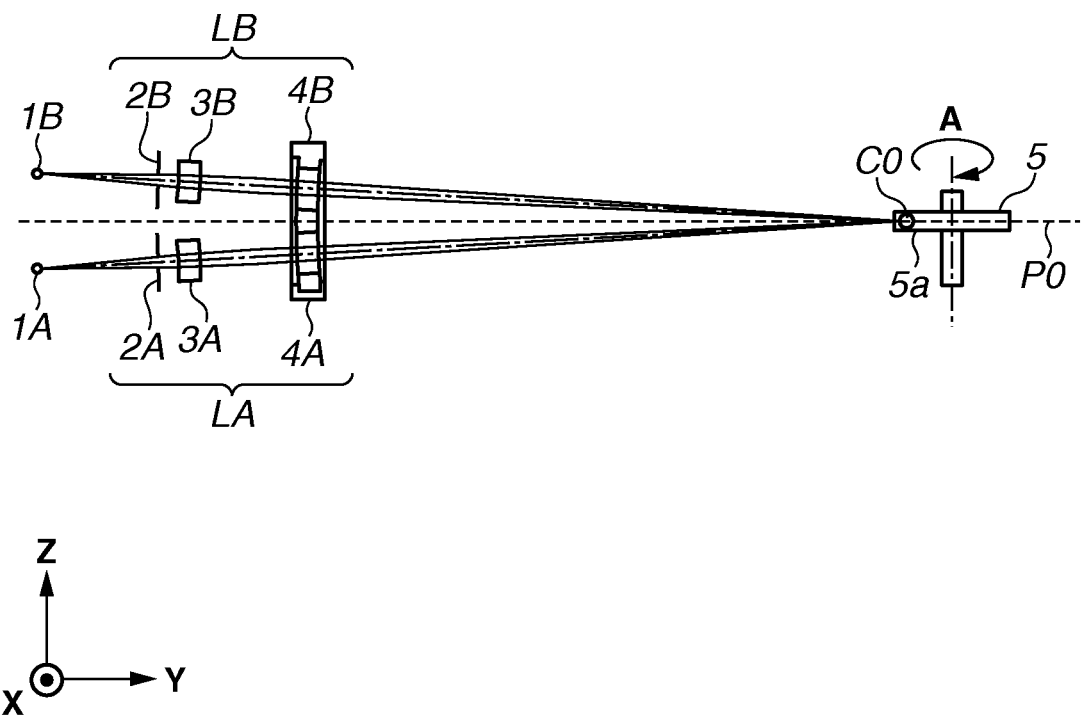
FIG. 13 is a diagrammatic illustration (a sub-scanning cross section drawing) of main parts of an incident optical system according to the second exemplary embodiment of the present invention.

FIGS. 11 to 13 are diagrammatic illustrations of main parts of an optical scanning apparatus 200 according to a second exemplary embodiment of the present invention. FIG. 11 is a ZX cross section drawing (a sub-scanning cross section drawing), FIGS. 12A and 12B are XY cross section drawings (a main scanning cross section drawing), and FIG. 13 is a YZ cross section drawing. The optical scanning apparatus 100 according to the above-described first exemplary embodiment guides the light beam Rb which is deflected and reflected to an upper side (+Z side) than the reference plane P0 by the deflector 5 to the scanned surface 8B. In contrast, the optical scanning apparatus 200 according to the present exemplary embodiment is different from the optical scanning apparatus 100 according to the first exemplary embodiment at the point that the light beam Rb which is deflected and reflected to a lower side (−Z side) than the reference plane P0 by the deflector 5 is guided to the scanned surface 8B.

In other words, according to the present exemplary embodiment, the light beam Rb from the imaging lens 7 is reflected downward to the imaging lens 7 by the mirror M1 disposed on a lower side with respect to the center position of the outer shape of the imaging lens 7 in the sub-scanning direction as illustrated in FIG. 11. In addition, the light beam Rb from the mirror M1 is reflected and guided to the scanned surface 8B by the mirror M2 disposed on the lower side with respect to the center position of the outer shape of the imaging lens 7 in the sub-scanning direction. According to the above-described configuration, the present exemplary embodiment can realize both of avoidance of interference of the light beam Rb with the imaging lens 7 and downsizing of the apparatus while reducing a difference between the optical path lengths of the imaging optical system SA and the imaging optical system SB than the first exemplary embodiment.

According to the present exemplary embodiment, the optical path length corresponding to the imaging optical system SA is given as Ta=T1=161.114 mm, the optical path length corresponding to the imaging optical system SB is given as Tb=T2=197.000 mm, and T2−T1=35.886 mm is obtained, so that the conditional equations (1) and (1a) are satisfied. In addition, the convergence of the imaging optical system SA is given as ma=m1=0.008, the convergence of the imaging optical system SB is given as mb=m2=−0.254, and m1−m2=0.26 is obtained, so that the conditional equations (2) and (2a) are satisfied.

As described above, according to the present exemplary embodiment, the difference between the optical path lengths is small in comparison with the first exemplary embodiment, and thus the difference between the convergence can be reduced in comparison with the first exemplary embodiment. Accordingly, when the convergence of the imaging optical system SA is set to a small value close to zero (ma=0.008≈0), the light beam entering into the deflector 5 can be an approximately parallel light beam in the main scanning cross section. Thus, the imaging optical system SA according to the present exemplary embodiment can suppress the main scanning jitter generated due to large convergence.

According to the present exemplary embodiment, m=|m2|=|mb|=0.254 is obtained, and the conditional equations (3) and (3a) are satisfied. Further, the Kθ coefficient of the imaging optical system SA is given as Ka=K1=136.5 (mm/rad), the Kθ coefficient of the imaging optical system SB is given as Kb=K2=167.0 (mm/rad), and K1/K2=0.82 is obtained, so that the conditional equations (4) and (4a) are satisfied.

Similar to the first exemplary embodiment, specification values, optical arrangement, and a surface shape of each imaging lens of the optical scanning apparatus 200 according to the present exemplary embodiment are shown in the following Tables 5 to 8.

TABLE 5

| Specification Value | | |
|---|---|---|
| laser wavelength(nm) | λ | 790 |
| laser irradiation angle in main scanning cross section (deg) | αm | 90 |
| laser irradiation angle in sub-scanning cross section (deg) | αsA | 3 |
| refractive index of coupling lens 3A | n3A | 1.762 |
| refractive index of cylindrical lens 4A | n4 | 1.524 |
| refractive index of imaging lens 6 | n6 | 1.524 |
| refractive index of first imaging portion 7A | n7A | 1.524 |
| coordinate of rotation axis of polygon mirror (mm) defining deflection point on axis as (0, 0, 0) | X direction | −5.683 |
| | Y direction | 4.315 |
| Kθ coefficient (mm/rad) | K | 136.50 |
| circumscribed circle diameter (mm) | Rp | φ20 |
| number of surfaces of polygon mirror | MEN | 4 |
| maximum scanning field angle (deg) | θmax | 47.7 |
| stop diameter of aperture stop 2A (mm) (aperture has rectangular shape) | Y direction | 1.90 |
| | Z direction | 2.14 |
| effective scanning width (mm) | W | 210 |
| distance from rear principal plane of imaging optical system A to scanned surface in main scanning cross section (mm) | Sk | 135.848 |
| focal length of imaging optical system A in main scanning cross section (mm) | f | 136.966 |
| convergence (1 − Sk/f) | ma | 0.008 |
| optical path length of imaging optical system A (mm) (distance from deflection surface to scanned surface) | Ta | 161.114 |
| sub-scanning cross magnification in imaging optical system A (times) | βa | −2.36 |
| reflection angle of mirror M3 (deg) | γ3 | 45.2 |
| resolution in main scanning direction (dpi) | Dpi_m | 600 |
| resolution in sub-scanning direction (dpi) | Dpi_s | 600 |

| Optical Arrangement | | | | | | | |
|---|---|---|---|---|---|---|---|
| | | origin of each surface | | | optical axis direction (expressed in direction cosine) | | |
| | | X coordinate | Y coordinate | Z coordinate | X component | Y component | Z component |
| light source 1A | | 0.000 | −113.844 | −5.966 | 0.000 | −0.999 | −0.052 |
| aperture stop 2A | | 0.000 | −113.594 | −5.953 | 0.000 | −0.999 | −0.052 |
| coupling lens 3A | incident surface | 0.000 | −97.866 | −5.129 | 0.000 | −0.999 | −0.052 |
| | light emitting surface | 0.000 | −95.548 | −5.007 | 0.000 | −0.999 | −0.052 |
| cylindrical lens 4A | incident surface | 0.000 | −92.552 | −4.850 | 0.000 | −0.999 | −0.052 |
| | light emitting surface | 0.000 | −79.770 | −4.181 | 0.000 | −0.999 | −0.052 |
| polygon mirror 5 | deflection surface 5a (deflection point on axis) | 0.000 | 0.000 | 0.000 | — | — | — |
| imaging lens 6 | incident surface | 17.200 | −0.237 | 0.000 | 1.000 | 0.000 | 0.000 |
| | light emitting surface | 23.200 | −0.237 | 0.000 | 1.000 | 0.000 | 0.000 |
| first imaging portion 7A | incident surface | 39.200 | −0.237 | 2.240 | 1.000 | 0.000 | 0.000 |
| | light emitting surface | 44.200 | −0.237 | 2.240 | 1.000 | 0.000 | 0.000 |
| mirror M3 | reflection surface | 94.817 | −0.170 | 2.990 | 0.704 | 0.000 | 0.710 |
| scanned surface 8A | | 94.817 | −0.170 | −63.702 | 0.000 | 0.000 | 1.000 |

A surface vertex position is expressed by coordinates when defining a deflection point on axis as (X, Y, Z) = (0, 0, 0) (unit: mm)

TABLE 6

| | coupling lens 3A | | cylindrical lens 4A | | imaging lens 6 | | first imaging portion 7A | |
|---|---|---|---|---|---|---|---|---|
| | incident surface | light emitting surface | incident surface | light emitting surface | incident surface | light emitting surface | incident surface | light emitting surface |
| | Main Scanning Direction | | | | | | | |
| R | ∞ | −15.2360 | ∞ | ∞ | −3.8143E+01 | −2.3021E+01 | −2.8381E+02 | 3.4460E+02 |
| K | — | — | 0.0000E+00 | — | −3.9315E−01 | −2.0156E+00 | −4.7798E+02 | −4.3345E+02 |

TABLE 6-continued

|  |  | coupling lens 3A | | cylindrical lens 4A | | imaging lens 6 | | first imaging portion 7A | |
| --- | --- | --- | --- | --- | --- | --- | --- | --- | --- |
|  |  | incident surface | light emitting surface | incident surface | light emitting surface | incident surface | light emitting surface | incident surface | light emitting surface |
| UPPER | B2_u | — | — | 0.0000E+00 | — | 0.0000E+00 | 0.0000E+00 | 0.0000E+00 | 0.0000E+00 |
|  | B4_u | — | — | 0.0000E+00 | — | 6.2445E−06 | −4.4448E−06 | −1.1110E−07 | −3.4031E−06 |
|  | B6_u | — | — | 0.0000E+00 | — | 5.8484E−09 | 1.2596E−08 | −6.9205E−10 | 1.4861E−09 |
|  | B8_u | — | — | 0.0000E+00 | — | 0.0000E+00 | 0.0000E+00 | 2.6147E−13 | −7.8199E−13 |
|  | B10_u | — | — | 0.0000E+00 | — | 0.0000E+00 | 0.0000E+00 | 0.0000E+00 | 1.8695E−16 |
|  | B12_u | — | — | 0.0000E+00 | — | 0.0000E+00 | 0.0000E+00 | 0.0000E+00 | 0.0000E+00 |
| LOWER | B2_l | — | — | 0.0000E+00 | — | 0.0000E+00 | 0.0000E+00 | 0.0000E+00 | 0.0000E+00 |
|  | B4_l | — | — | 0.0000E+00 | — | 6.2445E−06 | −4.4448E−06 | −1.1110E−07 | −3.4031E−06 |
|  | B6_l | — | — | 0.0000E+00 | — | 5.8484E−09 | 1.2596E−08 | −6.9205E−10 | 1.4861E−09 |
|  | B8_l | — | — | 0.0000E+00 | — | 0.0000E+00 | 0.0000E+00 | 2.6147E−13 | −7.8199E−13 |
|  | B10_l | — | — | 0.0000E+00 | — | 0.0000E+00 | 0.0000E+00 | 0.0000E+00 | 1.8695E−16 |
|  | B12_l | — | — | 0.0000E+00 | — | 0.0000E+00 | 0.0000E+00 | 0.0000E+00 | 0.0000E+00 |
|  |  |  |  |  | Sub-Scanning Direction | | | | |
|  | r | ∞ | −15.2164 | 5.8621E+01 | ∞ | 5.0000E+01 | 1.6137E+01 | 9.3012E+01 | −1.5488E+01 |
| UPPER | E2_u | — | — | 0.0000E+00 | — | 0.0000E+00 | −4.0637E−05 | 6.4508E−05 | 8.9785E−05 |
|  | E4_u | — | — | 0.0000E+00 | — | 0.0000E+00 | −7.2436E−08 | −1.8984E−07 | −1.5833E−07 |
|  | E6_u | — | — | 0.0000E+00 | — | 0.0000E+00 | 9.1894E−11 | 2.4165E−10 | 1.4032E−10 |
|  | E8_u | — | — | 0.0000E+00 | — | 0.0000E+00 | 0.0000E+00 | −1.1795E−13 | −3.6560E−14 |
|  | E10_u | — | — | 0.0000E+00 | — | 0.0000E+00 | 0.0000E+00 | 9.3050E−18 | −7.4921E−18 |
| LOWER | E2_l | — | — | 0.0000E+00 | — | 0.0000E+00 | −4.0637E−05 | 6.4508E−05 | 8.9785E−05 |
|  | E4_l | — | — | 0.0000E+00 | — | 0.0000E+00 | −7.2436E−08 | −2.2405E−07 | −1.9878E−07 |
|  | E6_l | — | — | 0.0000E+00 | — | 0.0000E+00 | 9.1894E−11 | 3.3095E−10 | 2.5121E−10 |
|  | E8_l | — | — | 0.0000E+00 | — | 0.0000E+00 | 0.0000E+00 | −2.7455E−13 | −1.8581E−13 |
|  | E10_l | — | — | 0.0000E+00 | — | 0.0000E+00 | 0.0000E+00 | 9.2721E−17 | 5.5617E−17 |
|  | m0_1 | — | — | 0.0000E+00 | — | 0.0000E+00 | 0.0000E+00 | 6.5129E−02 | −5.5854E−02 |
| UPPER | m2_1_u | — | — | 0.0000E+00 | — | 0.0000E+00 | 0.0000E+00 | 1.4529E−05 | 7.3789E−05 |
|  | m4_1_u | — | — | 0.0000E+00 | — | 0.0000E+00 | 0.0000E+00 | 3.8232E−08 | −3.0583E−08 |
|  | m6_1_u | — | — | 0.0000E+00 | — | 0.0000E+00 | 0.0000E+00 | −1.0935E−10 | 1.1339E−11 |
|  | m8_1_u | — | — | 0.0000E+00 | — | 0.0000E+00 | 0.0000E+00 | 5.2353E−14 | −4.5267E−14 |
|  | m10_1_u | — | — | 0.0000E+00 | — | 0.0000E+00 | 0.0000E+00 | 1.0469E−17 | 3.1862E−17 |
|  | m12_1_u | — | — | 0.0000E+00 | — | 0.0000E+00 | 0.0000E+00 | 0.0000E+00 | 0.0000E+00 |
|  | m14_1_u | — | — | 0.0000E+00 | — | 0.0000E+00 | 0.0000E+00 | 0.0000E+00 | 0.0000E+00 |
|  | m16_1_u | — | — | 0.0000E+00 | — | 0.0000E+00 | 0.0000E+00 | 0.0000E+00 | 0.0000E+00 |
| LOWER | m2_1_l | — | — | 0.0000E+00 | — | 0.0000E+00 | 0.0000E+00 | 6.3194E−07 | 5.6471E−05 |
|  | m4_1_l | — | — | 0.0000E+00 | — | 0.0000E+00 | 0.0000E+00 | −5.8413E−08 | −6.3698E−08 |
|  | m6_1_l | — | — | 0.0000E+00 | — | 0.0000E+00 | 0.0000E+00 | 8.4638E−11 | 3.4861E−11 |
|  | m8_1_l | — | — | 0.0000E+00 | — | 0.0000E+00 | 0.0000E+00 | −3.4393E−14 | 1.6293E−14 |
|  | m10_1_l | — | — | 0.0000E+00 | — | 0.0000E+00 | 0.0000E+00 | −9.3746E−18 | −1.9955E−17 |
|  | m12_1_l | — | — | 0.0000E+00 | — | 0.0000E+00 | 0.0000E+00 | 0.0000E+00 | 0.0000E+00 |
|  | m14_1_l | — | — | 0.0000E+00 | — | 0.0000E+00 | 0.0000E+00 | 0.0000E+00 | 0.0000E+00 |
|  | m16_1_l | — | — | 0.0000E+00 | — | 0.0000E+00 | 0.0000E+00 | 0.0000E+00 | 0.0000E+00 |
| additional shape | C3 | — | — | 0.0000E+00 | −2.0000E−03 | 0.0000E+00 | 0.0000E+00 | 0.0000E+00 | 0.0000E+00 |

TABLE 7

| Specification Value | | |
| --- | --- | --- |
| laser wavelength(nm) | λ | 790 |
| laser irradiation angle in main scanning cross section (deg) | αm | 90 |
| laser irradiation angle in sub-scanning cross section (deg) | αsB | −3 |
| refractive index of coupling lens 3B | n3 | 1.762 |
| refractive index of cylindrical lens 4B | n4 | 1.524 |
| refractive index of imaging lens 6 | n6 | 1.524 |
| refractive index of second imaging portion 7B | n7B | 1.524 |
| coordinate of rotation axis of polygon mirror (mm) defining deflection point on axis as (0, 0, 0) | X direction | −5.683 |
|  | Y direction | 4.315 |
| Kθ coefficient (mm/rad) | K | 167.00 |
| circumscribed circle diameter (mm) | Rp | φ20 |
| number of surfaces of polygon mirror | MEN | 4 |
| maximum scanning field angle (deg) | θmax | 37.7 |
| stop diameter of aperture stop 2B (mm) (aperture has rectangular shape) | Y direction | 2.00 |
|  | Z direction | 2.74 |
| effective scanning width (mm) | W | 210 |
| distance from rear principal plane of imaging optical system B to scanned surface in main scanning cross section (mm) | Sk | 171.734 |
| focal length of imaging optical system B in main scanning cross section (mm) | f | 136.966 |

TABLE 7-continued

| | | |
|---|---|---|
| convergence (1 − Sk/f) | mb | −0.254 |
| optical path length of imaging optical system B (mm) (distance from deflection surface to scanned surface) | Tb | 197 |
| sub-scanning cross magnification in imaging optical system B (times) | βb | −3.07 |
| reflection angle of mirror M1 (deg) | γ1 | 4.8 |
| reflection angle of mirror M2 (deg) | γ2 | −40.0 |
| resolution in main scanning direction (dpi) | Dpi_m | 600 |
| resolution in sub-scanning direction (dpi) | Dpi_s | 600 |

Optical Arrangement

| | | origin of each surface | | | optical axis direction (expressed in direction cosine) | | |
|---|---|---|---|---|---|---|---|
| | | X coordinate | Y coordinate | Z coordinate | X component | Y component | Z component |
| light source 1B | | 0.000 | −113.844 | 5.966 | 0.000 | −0.999 | 0.052 |
| aperture stop 2B | | 0.000 | −97.866 | 5.129 | 0.000 | −0.999 | 0.052 |
| coupling lens 3B | incident surface | 0.000 | −95.548 | 5.007 | 0.000 | −0.999 | 0.052 |
| | light emitting surface | 0.000 | −92.552 | 4.850 | 0.000 | −0.999 | 0.052 |
| cylindrical lens 4B | incident surface | 0.000 | −79.770 | 4.181 | 0.000 | −0.999 | 0.052 |
| | light emitting surface | 0.000 | −76.774 | 4.024 | 0.000 | −0.999 | 0.052 |
| polygon mirror 5 | deflection surface 5a (deflection point on axis) | 0.000 | 0.000 | 0.000 | — | — | — |
| imaging lens 6 | incident surface | 17.200 | −0.237 | 0.000 | 1.000 | 0.000 | 0.000 |
| | light emitting surface | 23.200 | −0.237 | 0.000 | 1.000 | 0.000 | 0.000 |
| second imaging portion 7B | incident surface | 39.200 | −0.237 | −2.240 | 1.000 | 0.000 | 0.000 |
| | light emitting surface | 44.200 | −0.237 | −2.240 | 1.000 | 0.000 | 0.000 |
| mirror M1 | reflection surface | 86.690 | 0.000 | −2.755 | 0.996 | 0.000 | 0.084 |
| mirror M2 | reflection surface | 27.817 | 0.000 | −13.125 | 0.766 | 0.000 | −0.643 |
| scanned surface 8B | | 27.817 | −0.237 | −63.702 | 0.000 | 0.000 | −1.000 |

A surface vertex position is expressed by coordinates when defining a deflection point on axis as (X, Y, Z) = (0, 0, 0) (unit: mm)

TABLE 8

| | | coupling lens 3B | | cylindrical lens 4B | | imaging lens 6 | | second imaging portion 7B | |
|---|---|---|---|---|---|---|---|---|---|
| | | incident surface | light emitting surface | incident surface | light emitting surface | incident surface | light emitting surface | incident surface | light emitting surface |
| Main Scanning Direction | | | | | | | | | |
| | R | ∞ | −15.8362 | ∞ | ∞ | −3.8143E+01 | −2.3021E+01 | −2.8381E+02 | 3.4460E+02 |
| | K | — | — | 0.0000E+00 | — | −3.9315E−01 | −2.0156E+00 | −4.7798E+02 | −4.3345E+02 |
| UPPER | B2_u | — | — | 0.0000E+00 | — | 0.0000E+00 | 0.0000E+00 | 0.0000E+00 | 0.0000E+00 |
| | B4_u | — | — | 0.0000E+00 | — | 6.2445E−06 | −4.4448E−06 | −1.6855E−07 | −3.3155E−06 |
| | B6_u | — | — | 0.0000E+00 | — | 5.8484E−09 | 1.2596E−08 | −9.2369E−10 | 1.3461E−09 |
| | B8_u | — | — | 0.0000E+00 | — | 0.0000E+00 | 0.0000E+00 | 4.7087E−13 | −7.1570E−13 |
| | B10_u | — | — | 0.0000E+00 | — | 0.0000E+00 | 0.0000E+00 | 0.0000E+00 | 2.2034E−16 |
| | B12_u | — | — | 0.0000E+00 | — | 0.0000E+00 | 0.0000E+00 | 0.0000E+00 | 0.0000E+00 |
| LOWER | B2_l | — | — | 0.0000E+00 | — | 0.0000E+00 | 0.0000E+00 | 0.0000E+00 | 0.0000E+00 |
| | B4_l | — | — | 0.0000E+00 | — | 6.2445E−06 | −4.4448E−06 | −1.6855E−07 | −3.3155E−06 |
| | B6_l | — | — | 0.0000E+00 | — | 5.8484E−09 | 1.2596E−08 | −9.2369E−10 | 1.3461E−09 |
| | B8_l | — | — | 0.0000E+00 | — | 0.0000E+00 | 0.0000E+00 | 4.7087E−13 | −7.1570E−13 |
| | B10_l | — | — | 0.0000E+00 | — | 0.0000E+00 | 0.0000E+00 | 0.0000E+00 | 2.2034E−16 |
| | B12_l | — | — | 0.0000E+00 | — | 0.0000E+00 | 0.0000E+00 | 0.0000E+00 | 0.0000E+00 |
| Sub-Scanning Direction | | | | | | | | | |
| | r | ∞ | −15.2164 | 5.8621E+01 | ∞ | 5.0000E+01 | 1.6137E+01 | 9.3012E+01 | −1.6496E+01 |
| UPPER | E2_u | — | — | 0.0000E+00 | 0.0000E+00 | 0.0000E+00 | −4.0637E−05 | 6.4508E−05 | 8.8221E−05 |
| | E4_u | — | — | 0.0000E+00 | 0.0000E+00 | 0.0000E+00 | −7.2436E−08 | −1.8984E−07 | −1.5735E−07 |
| | E6_u | — | — | 0.0000E+00 | 0.0000E+00 | 0.0000E+00 | 9.1894E−11 | 2.4165E−10 | 1.4032E−10 |
| | E8_u | — | — | 0.0000E+00 | 0.0000E+00 | 0.0000E+00 | 0.0000E+00 | −1.1795E−13 | −3.6560E−14 |
| | E10_u | — | — | 0.0000E+00 | 0.0000E+00 | 0.0000E+00 | 0.0000E+00 | 9.3050E−18 | −7.4921E−18 |
| LOWER | E2_l | — | — | 0.0000E+00 | 0.0000E+00 | 0.0000E+00 | −4.0637E−05 | 6.4508E−05 | 8.8221E−05 |
| | E4_l | — | — | 0.0000E+00 | 0.0000E+00 | 0.0000E+00 | −7.2436E−08 | −2.2405E−07 | −1.9775E−07 |
| | E6_l | — | — | 0.0000E+00 | 0.0000E+00 | 0.0000E+00 | 9.1894E−11 | 3.3095E−10 | 2.5121E−10 |
| | E8_l | — | — | 0.0000E+00 | 0.0000E+00 | 0.0000E+00 | 0.0000E+00 | −2.7455E−13 | −1.8581E−13 |
| | E10_l | — | — | 0.0000E+00 | 0.0000E+00 | 0.0000E+00 | 0.0000E+00 | 9.2721E−17 | 5.5617E−17 |
| | m0_l | — | — | 0.0000E+00 | 0.0000E+00 | 0.0000E+00 | 0.0000E+00 | −6.5129E−02 | 5.5854E−02 |
| UPPER | m2_l_u | — | — | 0.0000E+00 | 0.0000E+00 | 0.0000E+00 | 0.0000E+00 | −7.8946E−06 | −6.8514E−05 |
| | m4_l_u | — | — | 0.0000E+00 | 0.0000E+00 | 0.0000E+00 | 0.0000E+00 | −3.8108E−08 | 3.1322E−08 |
| | m6_l_u | — | — | 0.0000E+00 | 0.0000E+00 | 0.0000E+00 | 0.0000E+00 | 1.1148E−10 | −9.6611E−12 |
| | m8_l_u | — | — | 0.0000E+00 | 0.0000E+00 | 0.0000E+00 | 0.0000E+00 | −5.2353E−14 | 4.5267E−14 |

TABLE 8-continued

| | | coupling lens 3B | | cylindrical lens 4B | | imaging lens 6 | | second imaging portion 7B | |
|---|---|---|---|---|---|---|---|---|---|
| | | incident surface | light emitting surface | incident surface | light emitting surface | incident surface | light emitting surface | incident surface | light emitting surface |
| | m10_1_u | — | — | 0.0000E+00 | — | 0.0000E+00 | 0.0000E+00 | −1.0469E−17 | −3.1862E−17 |
| | m12_1_u | — | — | 0.0000E+00 | — | 0.0000E+00 | 0.0000E+00 | 0.0000E+00 | 0.0000E+00 |
| | m14_1_u | — | — | 0.0000E+00 | — | 0.0000E+00 | 0.0000E+00 | 0.0000E+00 | 0.0000E+00 |
| | m16_1_u | — | — | 0.0000E+00 | — | 0.0000E+00 | 0.0000E+00 | 0.0000E+00 | 0.0000E+00 |
| LOWER | m2_1_l | — | — | 0.0000E+00 | — | 0.0000E+00 | 0.0000E+00 | 6.1463E−06 | −5.1154E−05 |
| | m4_1_l | — | — | 0.0000E+00 | — | 0.0000E+00 | 0.0000E+00 | 5.8312E−08 | 6.3996E−08 |
| | m6_1_l | — | — | 0.0000E+00 | — | 0.0000E+00 | 0.0000E+00 | −7.8929E−11 | −3.0974E−11 |
| | m8_1_l | — | — | 0.0000E+00 | — | 0.0000E+00 | 0.0000E+00 | 3.4393E−14 | −1.6293E−14 |
| | m10_1_l | — | — | 0.0000E+00 | — | 0.0000E+00 | 0.0000E+00 | 9.3746E−18 | 1.9955E−17 |
| | m12_1_l | — | — | 0.0000E+00 | — | 0.0000E+00 | 0.0000E+00 | 0.0000E+00 | 0.0000E+00 |
| | m14_1_l | — | — | 0.0000E+00 | — | 0.0000E+00 | 0.0000E+00 | 0.0000E+00 | 0.0000E+00 |
| | m16_1_l | — | — | 0.0000E+00 | — | 0.0000E+00 | 0.0000E+00 | 0.0000E+00 | 0.0000E+00 |
| additional shape | C3 | — | — | 0.0000E+00 | −2.0000E−03 | 0.0000E+00 | 0.0000E+00 | 0.0000E+00 | 0.0000E+00 |

According to the present exemplary embodiment, each component is also arranged to satisfy the condition LD1>LD2, more specifically to satisfy that LD1 and LD2 are respectively 58.873 (mm) and 8.127 (mm), as with the case of the first exemplary embodiment. In addition, each component is arranged to satisfy the condition LM1>LM2, more specifically to satisfy that LM1 and LM2 are respectively 42.490 (mm) and 8.127 (mm). As shown in Tables 6 and 8, according to the present exemplary embodiment, the aspherical coefficients corresponding to the surface shapes of the first imaging portion 7A and the second imaging portion 7B are differentiated from each other as with the case of the first exemplary embodiment.

According to the present exemplary embodiment, the difference between the optical path lengths is small in comparison with the first exemplary embodiment, therefore the shape difference between the first imaging portion 7A and the second imaging portion 7B in the imaging lens 7 can be further reduced than the first exemplary embodiment. According to the first exemplary embodiment, the shapes of the first imaging portion 7A and the second imaging portion 7B near the optical axis in the main scanning direction are approximately the same. However, according to the present exemplary embodiment, the shapes near the optical axis in the sub-scanning direction also have vertically symmetrical shapes across the boundary portion. More specifically, values of the curvature radius R of the meridional line, the aspherical coefficient K, and the curvature radius r of the sagittal line of the incident surface are respectively the same in the first imaging portion 7A and the second imaging portion 7B. Further, an aspherical coefficient m0_1 indicating the sagittal line tilt amount on the optical axis is set to a value having a same absolute value and an opposite sign in the first imaging portion 7A and the second imaging portion 7B.

Figure 14A:
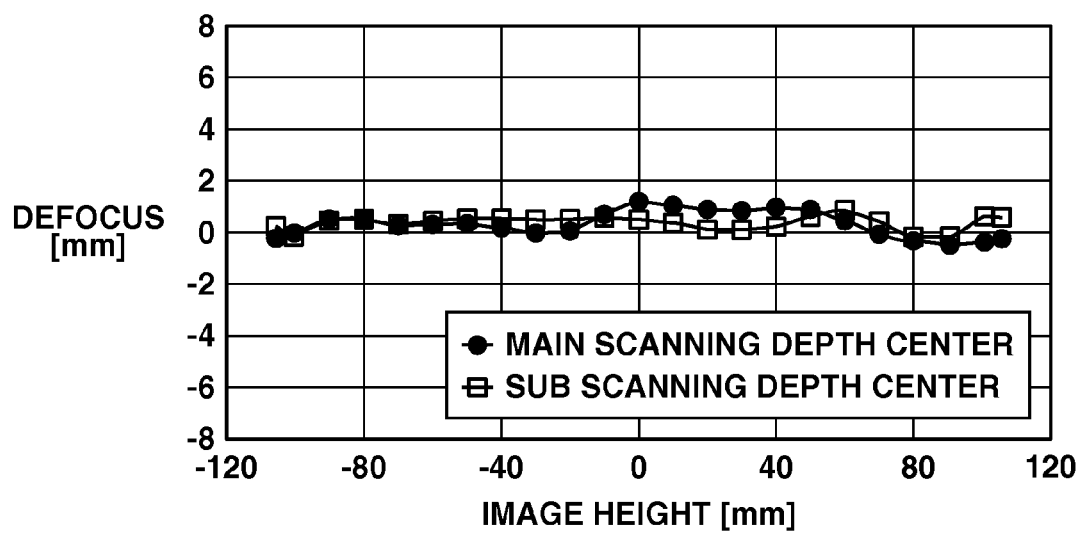
FIGS. 14A and 14B illustrate field curvature in a main scanning direction and a sub-scanning direction according to the second exemplary embodiment of the present invention.
Figure 14B:
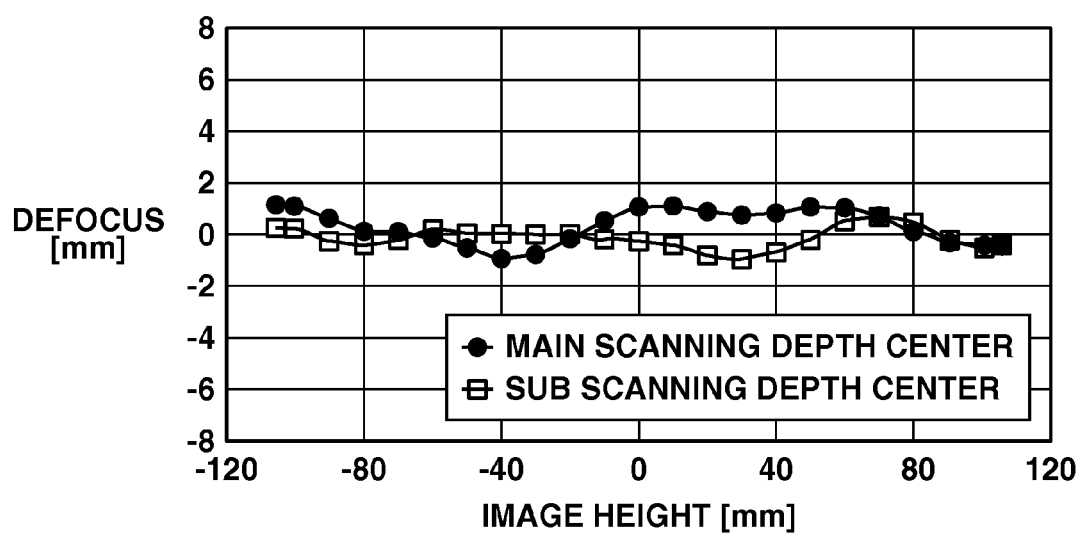

FIG. 14A is a graph illustrating field curvature in the main scanning direction and the sub-scanning direction according to the present exemplary embodiment. As illustrated in FIG. 14A, regarding the imaging optical system SA, the field curvature in the main scanning direction is given as dm=1.9 mm, and the field curvature in the sub-scanning direction is given as ds=1.6 mm. In addition, as illustrated in FIG. 14B, regarding the imaging optical system SB, the field curvature in the main scanning direction is given as dm=2.0 mm, and the field curvature in the sub-scanning direction is given as ds=1.6 mm. Accordingly, it can be understood that the field curvature are appropriately corrected in both of the imaging optical systems SA and SB.

Figure 15A:
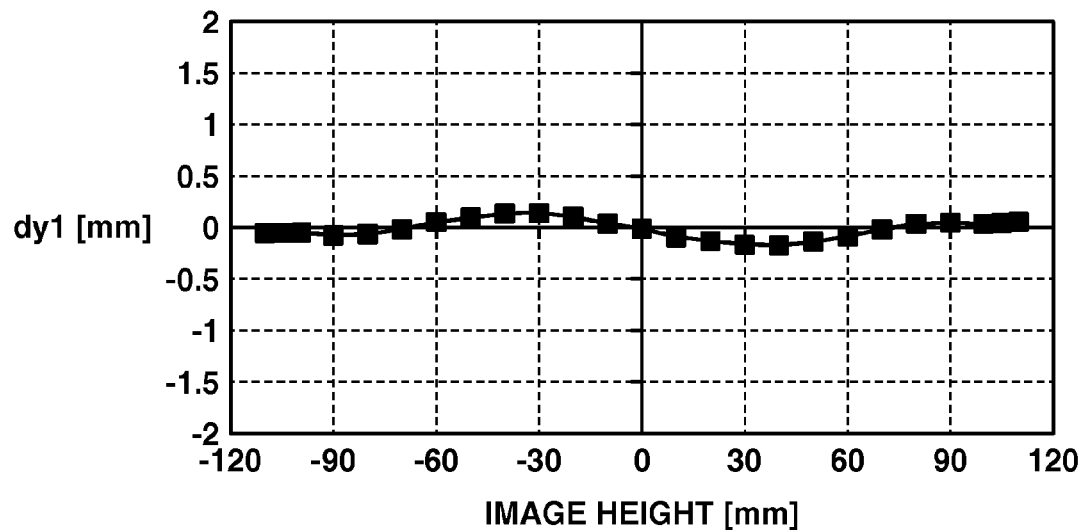
FIGS. 15A and 15B illustrate fθ characteristics according to the second exemplary embodiment of the present invention.
Figure 15B:
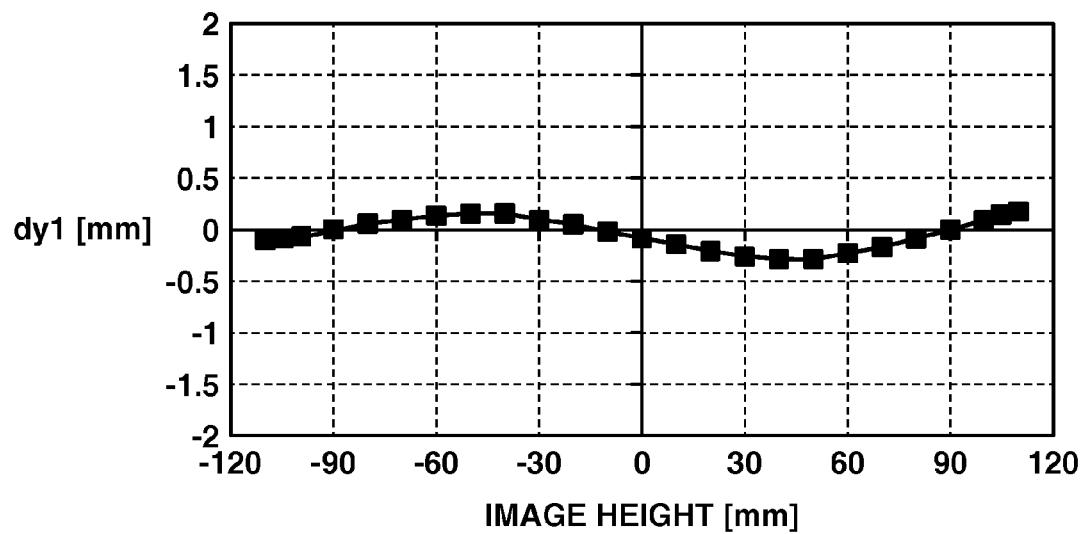

FIGS. 15A and 15B are graphs illustrating fθ characteristics dy1 according to the present exemplary embodiment. As illustrated in FIG. 15A, a difference in the imaging optical system SA is 0.16 mm at a maximum, and as illustrated in FIG. 15B, a difference in the imaging optical system SB is 0.26 mm at a maximum. According to the present exemplary embodiment, the difference of the fθ characteristics to change the spot diameter itself does not occur, and thus occurrence of density unevenness in an image can be suppressed.

Figure 16A:
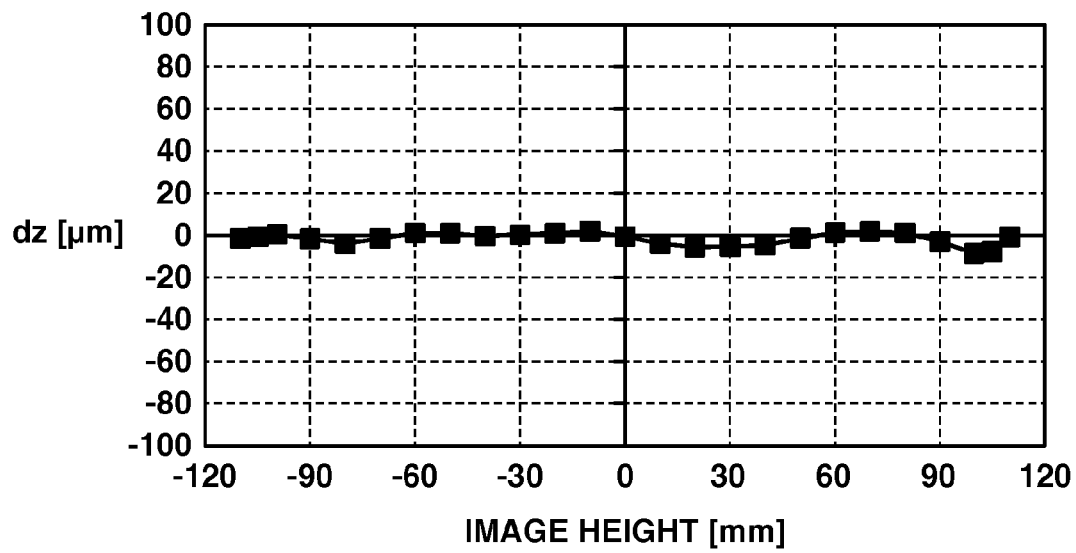
FIGS. 16A and 16B illustrate scanning line bending according to the second exemplary embodiment of the present invention.
Figure 16B:
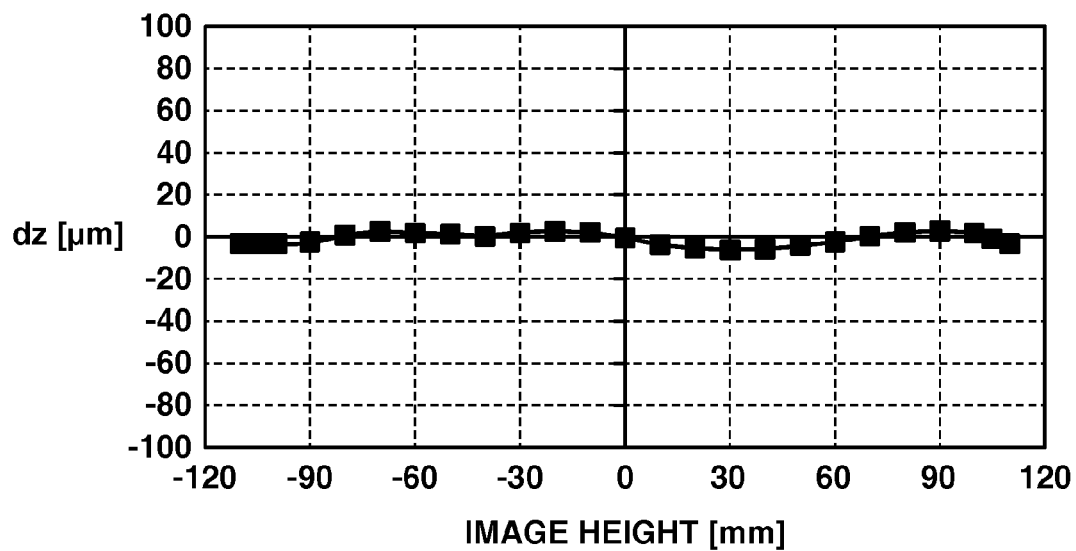

FIGS. 16A and 16B are graphs illustrating scanning line bending dz according to the present exemplary embodiment. As illustrated in FIG. 16A, a difference in the imaging optical system SA is 7 μm at a maximum, and as illustrated in FIG. 16B, a difference in the imaging optical system SB is 6 μm at a maximum. However, a level of either difference does not affect an image to be formed.

FIGS. 17A and 17B illustrate cross-sectional shapes of spots at each image height according to the present exemplary embodiment. According to the present exemplary embodiment, the power arrangement of each lens surface and the sagittal line tilt amounts of the incident surface and the light emitting surface of the imaging lens 7 are also optimized, and thus the scanning line bending and the twist of the wavefront aberration are both corrected. Accordingly, fine spot shapes with less twist can be obtained throughout all image heights.

Figure 18A:
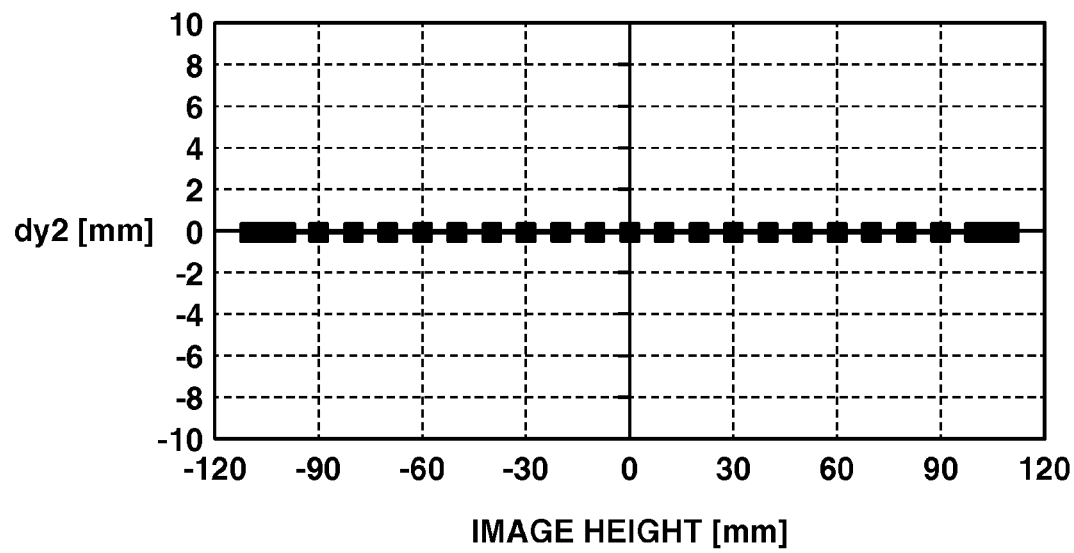
FIGS. 18A and 18B illustrate main scanning jitters according to the second exemplary embodiment of the present invention.
Figure 18B:
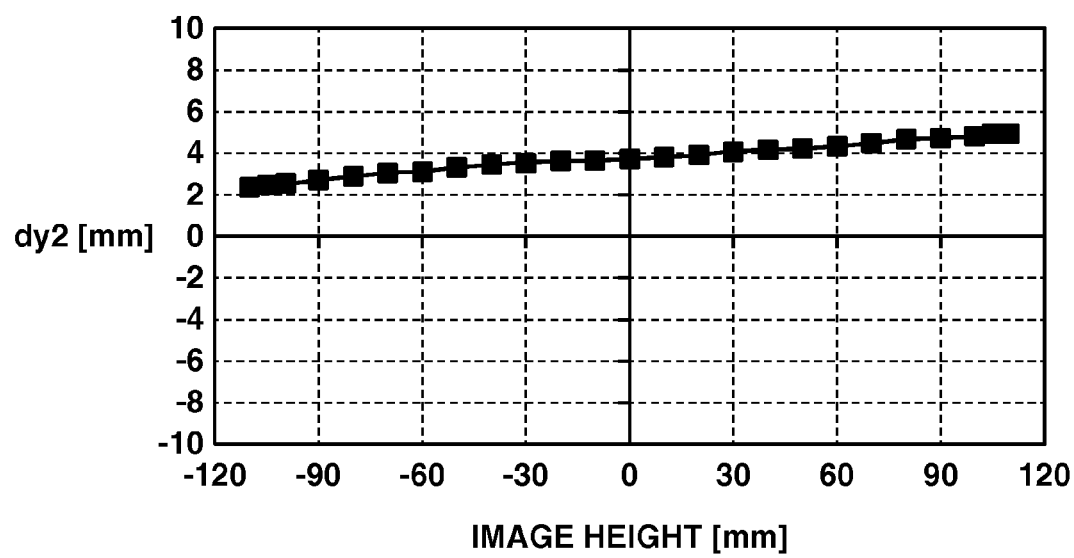

FIGS. 18A and 18B illustrate main scanning jitters dy2 when a shift eccentricity error in the deflection surface is 10 μm. As illustrated in FIG. 18A, the main scanning jitter in the imaging optical system SA is 0.8 μm at a maximum, and as illustrated in FIG. 18B, the main scanning jitter in the imaging optical system SB is 5.1 μm at a maximum, so that the jitters can be suppressed to a level causing no problem.

Figure 19A:
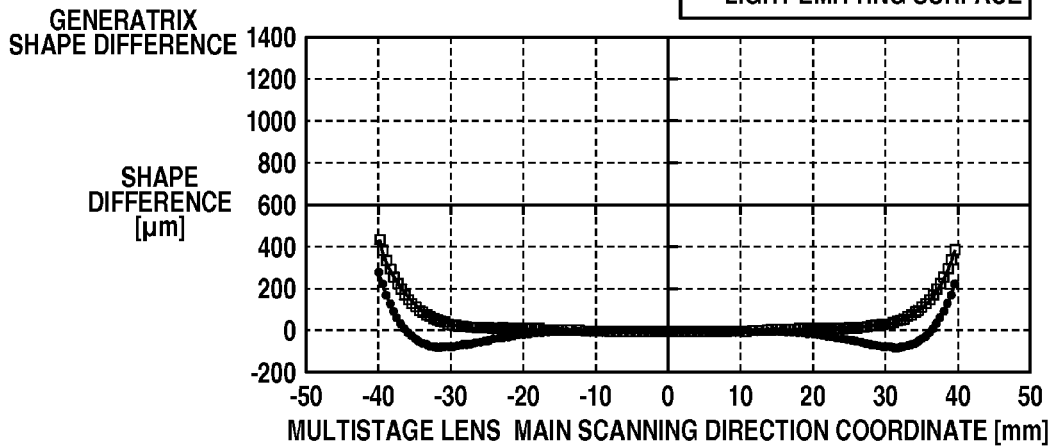
FIG. 19A to 19C illustrate shapes of an imaging lens 7 according to the second exemplary embodiment of the present invention.

FIG. 19A is a graph illustrating a difference between a meridional line shape of the first optical surface and a meridional line shape of the second optical surface included in the imaging lens 7. According to the present exemplary embodiment, arrangement and surface shapes of the incident surface and light emitting surface of the imaging lens 7 are respectively set so that the first imaging portion 7A and the second imaging portion 7B have approximately no difference in the meridional line shapes on the optical axis and its periphery. In addition, the meridional line shape of the second optical surface on a side of which optical path length is longer is changed to separate away from the deflector 5 with respect to the first optical surface on a side of which optical path length is shorter toward the end portion from the optical axis in the main scanning direction. According to the present exemplary embodiment, Xmax of the incident surface is 0.28 (mm), Xmax of the light emitting surface is 0.44 (mm), and both values satisfy the conditional equations (5) and (5a).

Figure 19B:
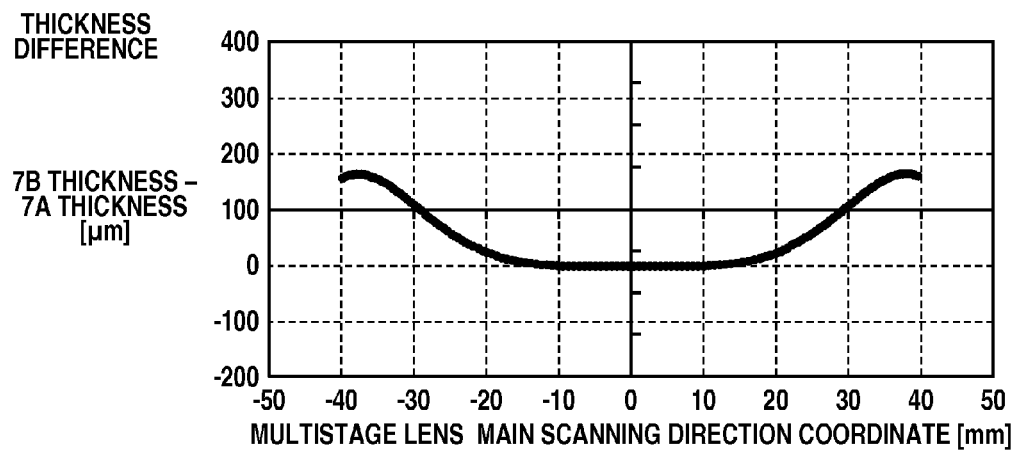

FIG. 19B is a graph illustrating a difference between a thickness of the first imaging portion 7A and a thickness of the second imaging portion 7B. According to the present exemplary embodiment, a thickness difference near the optical axis is also approximately zero, and the thickness of the first imaging portion 7A becomes larger than the thickness of the second imaging portion 7B toward the end portion from the optical axis in the main scanning direction. Further, according to the present exemplary embodiment, dmax is 0.17 (mm), and both of the conditional equations (6) and (6a) are satisfied.

Figure 19C:
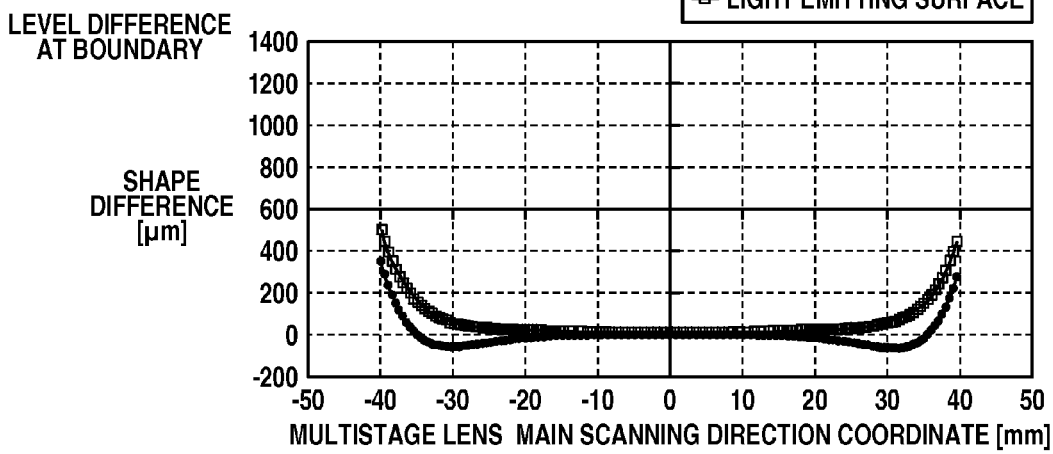

FIG. 19C is a graph illustrating a level difference between the first imaging portion 7A and the second imaging portion 7B at the boundary portion. The level difference is less than or equal to 600 μm in the entire area of the light beam using area of the imaging lens 7. According to the present exemplary embodiment, the focusing magnification in the sub-scanning cross section of the imaging optical system SA is given as $\beta a=-2.36$ (times), the focusing magnification in the sub-scanning cross section of the imaging optical system SB is given as $\beta b=-3.07$ (times), and $\beta s=\beta b$ is obtained, so that those values satisfy both of the conditional equations (7) and (7a).

As described above, the optical scanning apparatus 200 according to the present exemplary embodiment can further reduce the shape difference between the first imaging portion 7A and the second imaging portion 7B which is necessary for obtaining an excellent optical performance by setting the difference between the optical path lengths corresponding to the imaging optical system SA and the imaging optical system SB smaller than that of the first exemplary embodiment. In addition, as illustrated in FIGS. 19A to 19C, each of the shape difference, the thickness difference, and the level difference at the boundary portion in the main scanning direction can be made smaller than those of the first exemplary embodiment, and thus the present exemplary embodiment can further improve an issue at the time of injection molding, such as a warp of a lens caused by vertical asymmetry property of the shape of the imaging lens 7.

Figure 20:
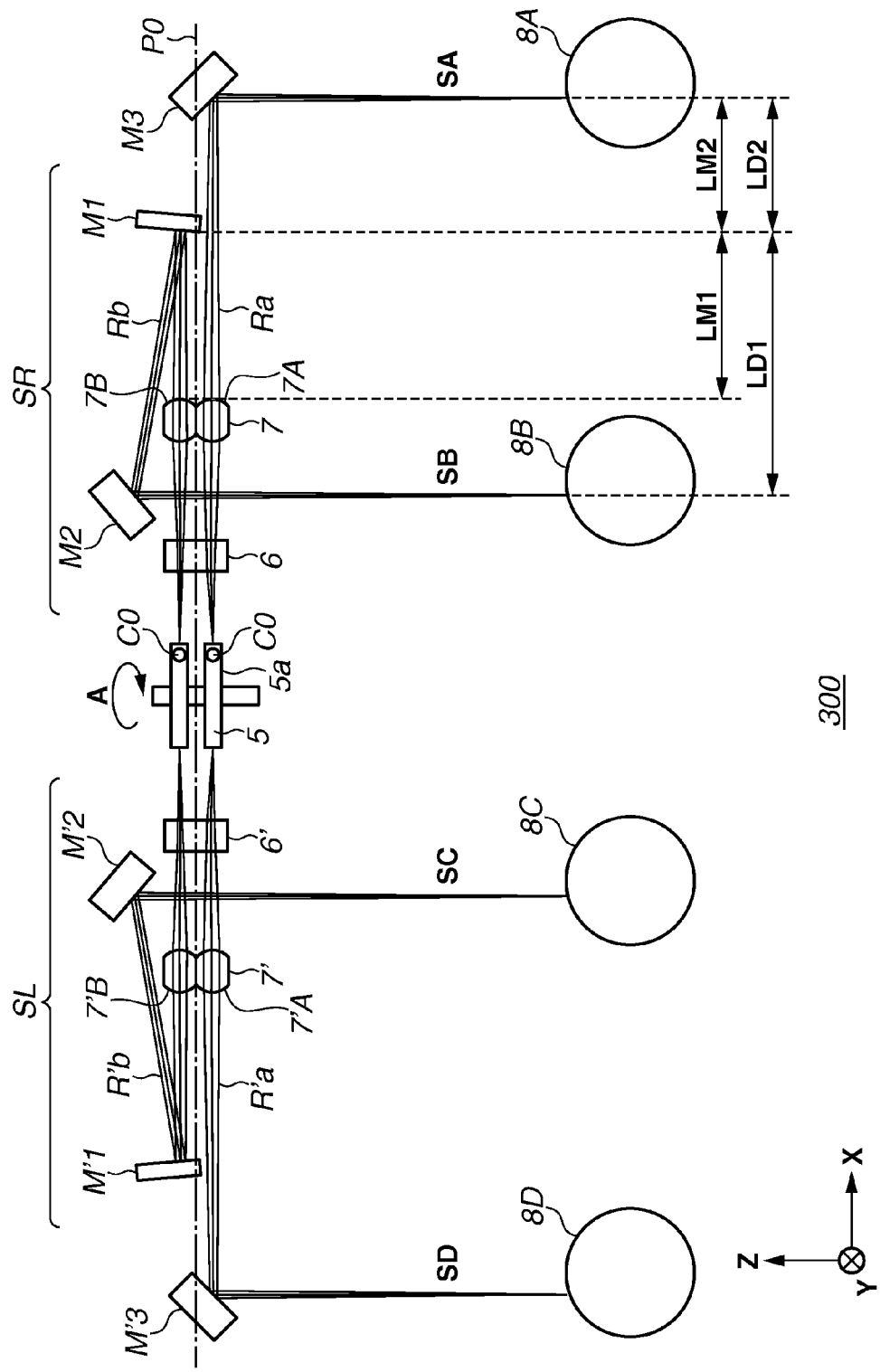
FIG. 20 is a diagrammatic illustration (a sub-scanning cross section drawing) of main parts of an optical scanning apparatus according to a third exemplary embodiment of the present invention.

FIG. 20 is a ZX cross section drawing (a sub-scanning cross section drawing) of an optical scanning apparatus 300 according to a third exemplary embodiment. The optical scanning apparatus 300 according to the present exemplary embodiment is different from the optical scanning apparatus 100 according to the first exemplary embodiment at the point that the optical scanning apparatus 300 adopts a multistage polygon mirror having deflection surfaces each of which is vertically divided into two as the deflector 5. Since the multistage polygon mirror is adopted as the deflector 5, the light beam emitted from each light source can be entered into the deflection surface 5a without an angle in the sub-scanning cross section, and thus the surface shape of the imaging lens 7 can be simplified in comparison with the first exemplary embodiment which adopts the sub-scanning oblique incidence optical system. More specifically, the imaging lens 7 can be designed without using a sagittal line tilt for correcting curvature of a scanning line and a twist of a wavefront aberration caused by the sub-scanning oblique incidence optical system.

[Image Forming Apparatus]

Figure 21:
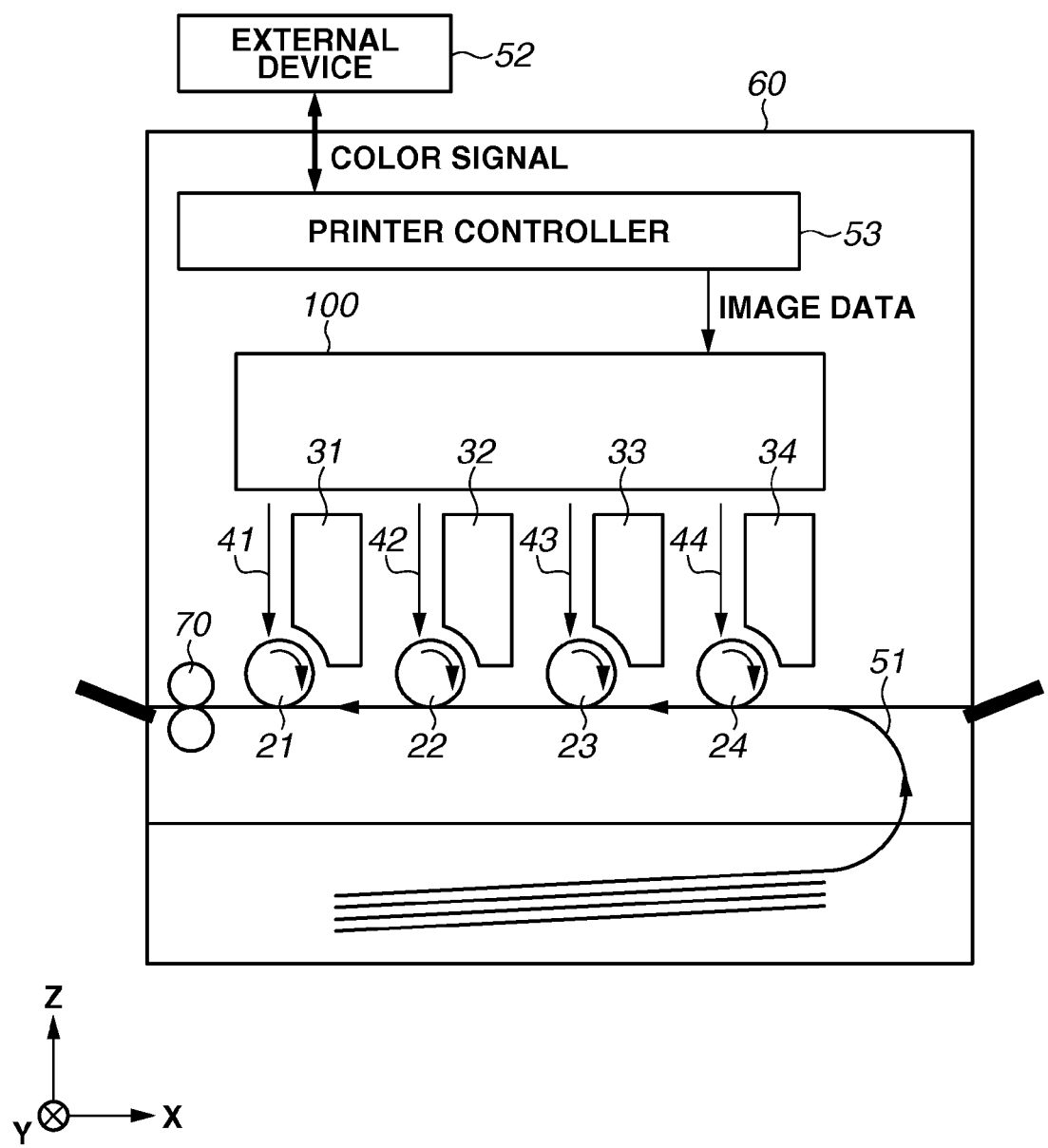
FIG. 21 is a diagrammatic illustration (a sub-scanning cross section drawing) of main parts of an image forming apparatus according to the exemplary embodiments of the present invention.

FIG. 21 is a diagrammatic illustration (a ZX cross section drawing) of main parts of an image forming apparatus according to the exemplary embodiments of the present invention. The image forming apparatus 60 is a tandem type color image forming apparatus which includes the optical scanning apparatuses 100 according to any one of the above described exemplary embodiments and records image information in parallel on photosensitive surfaces of four photosensitive drums.

As illustrated in FIG. 21, an external device 52, such as a personal computer, outputs a color signal of each color, namely R (red), G (green), and B (blue). These color signals are converted into respective image data (dot data) pieces of Y (yellow), M (magenta), C (cyan), and K (black) by a printer controller 53 in the apparatus and input to the optical scanning apparatus 100. The printer controller 53 controls each unit, such as a motor described below, in the image forming apparatus 60 in addition to the conversion of data.

The optical scanning apparatus 100 scans photosensitive surfaces (scanned surfaces) of photosensitive drums (photosensitive members) 21 to 24 as image bearing members in the main scanning direction (Y direction) with light beams 41 to 44 modulated in response to each image data. Each of the photosensitive drums 21 to 24 is rotated clockwise by the motor, not illustrated, and with this rotation, the photosensitive surface of each photosensitive drum is moved to the sub-scanning direction (Z direction) with respect to the light beams 41 to 44. The photosensitive surfaces of the photosensitive drums charged by a charging roller, not illustrated, are exposed to the respective light beams 41 to 44, so that electrostatic latent images are formed on the respective photosensitive surfaces.

Then, the electrostatic latent images of the respective colors formed on the photosensitive surfaces of the photosensitive drums 21 to 24 are developed as toner images of the respective colors by developing units 31 to 34. The toner images of the respective colors are transferred by a transfer unit, not illustrated, to overlap with each other onto a transferred material conveyed by a conveyance belt 51, and then fixed by a fixing unit 70. A sheet of a full color image is thus formed by the above-described processes.

In this regard, a color digital copying machine may be configured by connecting a color image reading apparatus including a line sensor, such as a charge coupled device (CCD) sensor and a complementary metal oxide semiconductor (CMOS) sensor, as the external device 52 to the image forming apparatus 60.

Modification

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

For example, according to the above-described exemplary embodiments, a polygon mirror including a plurality of deflection surfaces is adopted as a deflector, however the deflector is not limited to this. A resonance type deflector may be adopted which deflects a light beam by reciprocally vibrating one single deflection surface around a swing axis. When the resonance type deflector is used, occurrence of the above-described pitch variation caused by the surface tilt and main scanning jitter caused by the surface eccentricity can be suppressed. In addition, the deflector 5 of the optical scanning apparatus 200 according to the second exemplary embodiment may be the multistage polygon mirror described in the third exemplary embodiment.

According to the above-described exemplary embodiments, the multistage lens surface of the imaging lens 7 is formed in such a manner that the first optical surface and the second optical surface are discontinuous at the boundary portion and has a level difference therebetween, however, it is not limited to this. For example, a boundary portion having continuity may be formed by expressing an area near the boundary portion in a spline shape (the first optical surface and the second optical surface are connected by a spline function), and an entire area of the multistage lens surface may be expressed by a power series polynomial of the main scanning direction and the sub-scanning direction.

According to the above-described exemplary embodiments, the imaging optical system is constituted with two imaging lenses. However, the imaging optical system is not limited to this and may be constituted with three imaging lenses or one single imaging lens. In addition, each light source may be a monolithic multiple beam laser including a plurality of light emitting points.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2014-163209, filed Aug. 8, 2014 and No. 2014-163210, filed Aug. 8, 2014, which are hereby incorporated by reference herein in their entirety.

What is claimed is:

1. An optical scanning apparatus comprising:
   first and second light sources;
   a deflector configured to respectively deflect first and second light beams emitted from the first and second light sources by a first deflection surface and scan first and second scanned surfaces in a main scanning direction; and
   first and second imaging optical systems configured to respectively collect the first and second light beams deflected by the deflector to the first and second scanned surfaces,
   wherein the first and second imaging optical systems include a shared multistage lens including first and second optical surfaces arranged in a sub-scanning direction to which the first and second light beams enters, respectively,
   a first mirror configured to reflect the second light beam passing through the second optical surface;
   a second mirror configured to reflect the second light beam reflected by the first mirror toward the second scanned surface,
   wherein the second scanned surface is disposed on a position closer to the deflector than the first scanned surface,
   wherein a second optical path length from the first deflection surface to the second scanned surface is longer than a first optical path length from the first deflection surface to the first scanned surface,
   wherein the first and second imaging optical systems further include a shared first lens, separate from the shared multistage lens, to which the first and second light beams enter, and
   wherein a first reflection point on the first mirror and a second reflection point on the second mirror of the second light beam are positioned on a same side with respect to a center position of an outer shape of the multistage lens in the sub-scanning direction.

2. The optical scanning apparatus according to claim 1, wherein shapes of the first and second optical surfaces are asymmetrical with each other in the sub-scanning direction.

3. The optical scanning apparatus according to claim 1, wherein a distance from the first reflection point to the second scanned surface is longer than a distance from the first reflection point to the first scanned surface in an optical axis direction.

4. The optical scanning apparatus according to claim 1, wherein a distance from a light emitting surface of the multistage lens to the first reflection point is longer than a distance from the first reflection point to the first scanned surface in an optical axis direction.

5. The optical scanning apparatus according to claim 1, wherein the second reflection point exists on a position farther from the second scanned surface than the multistage lens in the sub-scanning direction.

6. The optical scanning apparatus according to claim 1, wherein a mirror other than the first and second mirrors is not disposed on an optical path from the first deflection surface to the second scanned surface.

7. The optical scanning apparatus according to claim 1, wherein an optical path from the deflector to the multistage lens and an optical path from the second mirror to the second scanned surface cross with each other in a sub-scanning cross section.

8. The optical scanning apparatus according to claim 1, wherein, when the first optical path length is defined as T1 (mm), and the second optical path length is defined as T2 (mm), a condition, $$25 \leq T2-T1 \leq 65$$

is satisfied.

9. The optical scanning apparatus according to claim 1, wherein, in a main scanning cross section, when an optical path length from a rear principal plane of the first imaging optical system to the first scanned surface is defined as Sk1 (mm), a focal length of the first imaging optical system is defined as f1 (mm), an optical path length from a rear principal plane of the second imaging optical system to the second scanned surface is defined as Sk2 (mm), a focal length of the second imaging optical system is defined as f2 (mm), first convergence of the first imaging optical system is defined as m1=1−Sk1/f1, and second convergence of the second imaging optical system is defined as m2=1−Sk2/f2, a condition, $$0.15 < |m1-m2| < 0.50$$

is satisfied.

10. The optical scanning apparatus according to claim 1, wherein, in a main scanning cross section, when an optical path length from a rear principal plane of the first imaging optical system to the first scanned surface is defined as Sk1 (mm), a focal length of the first imaging optical system is defined as f1 (mm), an optical path length from a rear principal plane of the second imaging optical system to the second scanned surface is defined as Sk2 (mm), a focal length of the second imaging optical system is defined as f2 (mm), first convergence of the first imaging optical system is defined as m1=1−Sk1/f1, second convergence of the second imaging optical system is defined as m2=1−Sk2/f2, and a greater one of |m1| and |m2| is defined as m, a condition $$0.2 < m < 0.5$$

is satisfied.

11. The optical scanning apparatus according to claim 1, wherein, when a Kθ coefficient of the first imaging optical system is defined as K1, and a Kθ coefficient of the second imaging optical system is defined as K2, a condition $$0.65 \le K1/K2 \le 0.85$$

is satisfied.

12. The optical scanning apparatus according to claim 1, wherein a relative surface shape of the second optical surface with respect to the first optical surface has a shape of which distance from the deflector increases from an optical axis toward an end portion in the main scanning direction.

13. The optical scanning apparatus according to claim 1, wherein, when a maximum value of a surface shape difference between the first optical surface and the second optical surface is defined as Xmax (mm), a condition $$0.1 \le |Xmax| \le 5.0$$

is satisfied.

14. The optical scanning apparatus according to claim 1, wherein the first and second optical surfaces are disposed to be shifted from each other in an optical axis direction at a boundary portion.

15. The optical scanning apparatus according to claim 1, wherein a difference between a first thickness corresponding to the first optical surface and a second thickness corresponding to the second optical surface in the multistage lens becomes larger from an optical axis toward an end portion in the main scanning direction.

16. The optical scanning apparatus according to claim 1, wherein, when a maximum value of a difference between a first thickness corresponding to the first optical surface and a second thickness corresponding to the second optical surface in the multistage lens is defined as dmax (mm), a condition $$0.05 < |dmax| \le 5.0$$

is satisfied.

17. The optical scanning apparatus according to claim 1, wherein, when a magnification of the second imaging optical system in a sub-scanning cross section is defined as βs, a condition $$2.5 \le |\beta s| 21\ 5.0$$

is satisfied.

18. An image forming apparatus comprising:
first and second light sources;
a deflector configured to respectively deflect first and second light beams emitted from the first and second light sources by a first deflection surface and scan first and second scanned surfaces in a main scanning direction;
first and second imaging optical systems configured to respectively collect the first and second light beams deflected by the deflector to the first and second scanned surfaces,
a developing unit configured to develop an electrostatic latent image formed on the first and second scanned surfaces by the first and second imaging optical systems as a toner image;
a transfer unit configured to transfer the developed toner image to a transferred material; and
a fixing unit configured to fix the transferred toner image to the transferred material,
wherein the first and second imaging optical systems include a shared multistage lens including first and second optical surfaces arranged in a sub-scanning direction to which the first and second light beams enters, respectively,
a first mirror configured to reflect the second light beam passing through the second optical surface;
a second mirror configured to reflect the second light beam reflected by the first mirror toward the second scanned surface,
wherein the second scanned surface is disposed on a position closer to the deflector than the first scanned surface,
wherein a second optical path length from the first deflection surface to the second scanned surface is longer than a first optical path length from the first deflection surface to the first scanned surface,
wherein the first and second imaging optical systems further include a shared first lens, separate from the shared multistage lens, to which the first and second light beams enter, and
wherein a first reflection point on the first mirror and a second reflection point on the second mirror of the second light beam are positioned on a same side with respect to a center position of an outer shape of the multistage lens in the sub-scanning direction.

19. An optical scanning apparatus comprising:
first and second light sources;
a deflector configured to respectively deflect first and second light beams emitted from the first and second light sources by a first deflection surface and scan first and second scanned surfaces in a main scanning direction; and
first and second imaging optical systems configured to respectively collect the first and second light beams deflected by the deflector to the first and second scanned surfaces,
wherein the first and second imaging optical systems include a shared multistage lens including first and second optical surfaces arranged in a sub-scanning direction to which the first and second light beams enters, respectively,
a first mirror configured to reflect the second light beam passing through the second optical surface;
a second mirror configured to reflect the second light beam reflected by the first mirror toward the second scanned surface,
wherein a second optical path length from the first deflection surface to the second scanned surface is longer than a first optical path length from the first deflection surface to the first scanned surface, and
wherein, in a main scanning cross section, when an optical path length from a rear principal plane of the first imaging optical system to the first scanned surface is defined as Sk1 (mm), a focal length of the first imaging optical system is defined as f1 (mm), an optical path length from a rear principal plane of the second imaging optical system to the second scanned surface is defined as Sk2 (mm), a focal length of the second imaging optical system is defined as f2 (mm), first convergence of the first imaging optical system is defined as m1=1−Sk1/f1, and second convergence of the second imaging optical system is defined as m2=1−Sk2/f2, a condition, $$0.15 < |m1-m2| < 0.50$$

is satisfied, and wherein the first and second imaging optical systems further include a shared first lens, separate from the shared multistage lens, to which the first and second light beams enter.

* * * * *